United States Patent
Gao

(10) Patent No.: US 12,418,319 B2
(45) Date of Patent: Sep. 16, 2025

(54) RADIO FREQUENCY RECEIVER AND WIRELESS COMMUNICATION APPARATUS

(71) Applicant: Huawei Technologies Co., Ltd., Shenzhen (CN)

(72) Inventor: Peng Gao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 358 days.

(21) Appl. No.: 18/191,078

(22) Filed: Mar. 28, 2023

(65) Prior Publication Data

US 2023/0268948 A1 Aug. 24, 2023

Related U.S. Application Data

(63) Continuation of application No. PCT/CN2020/119116, filed on Sep. 29, 2020.

(51) Int. Cl.
H04B 1/16 (2006.01)
(52) U.S. Cl.
CPC ..................................... *H04B 1/16* (2013.01)

(58) Field of Classification Search
CPC .......... H04B 1/16; H04B 1/0028; H04B 1/30; H04B 1/401; H04B 1/005
See application file for complete search history.

(56) References Cited

U.S. PATENT DOCUMENTS

| | | | |
|---|---|---|---|
| 8,335,484 B1* | 12/2012 | Arad | H04B 1/0003 455/67.11 |
| 9,100,622 B2* | 8/2015 | Reddy | H04N 5/50 |
| 10,797,738 B2* | 10/2020 | Shanan | H04B 1/0057 |

* cited by examiner

*Primary Examiner* — Kabir A Timory
(74) *Attorney, Agent, or Firm* — Slater Matsil, LLP

(57) ABSTRACT

This application discloses a radio frequency receiver and a wireless communication apparatus. The radio frequency receiving apparatus includes: a first receiver, including a first receive channel and a second receive channel; a second receiver, including a third receive channel, where both maximum signal bandwidths supported by the first receive channel and the second receive channel are less than a maximum signal bandwidth supported by the third receive channel; an analog-to-digital converter ADC group, including a plurality of ADCs, where the plurality of ADCs includes a first ADC and a second ADC; and a channel router, configured to allocate an ADC.

20 Claims, 13 Drawing Sheets

RADIO FREQUENCY RECEIVER AND WIRELESS COMMUNICATION APPARATUS

CROSS-REFERENCE TO RELATED APPLICATIONS

This application is a continuation of International Application No. PCT/CN2020/119116, filed on Sep. 29, 2020, the disclosure of which is hereby incorporated by reference in its entirety.

TECHNICAL FIELD

This application relates to the field of integrated circuits, and in particular, to a radio frequency receiver and a wireless communication apparatus.

BACKGROUND

With the development of wireless communication, to meet requirements of a user peak rate and a system capacity, a multi-antenna-based multi-input multi-output (MIMO) technology is widely applied to a long term evolution (LTE) system and a new radio (NR) system. To support MIMO communication, a radio frequency transceiver needs to provide a plurality of receive channels or a plurality of transmit channels for processing a plurality of data streams in parallel.

In the LTE system, all frequency resources of the system are frequencies below 6 GHz. Because the frequency resources below 6 GHz are extremely precious, and the frequency resources are almost exhausted in some countries and regions, a millimeter-wave frequency range is further introduced in the NR system, to support a greater communication bandwidth requirement. In the NR system, to distinguish between a frequency range below 6 GHz and a frequency range of a millimeter wave, an NR FR1 (Frequency Range 1) and NR FR2 (Frequency Range 2) are respectively defined. The NR FR1 is from 450 MHz to 6,000 MHz, and the NR FR2 is from 24,250 MHz to 52,600 MHz.

The NR FR1 is deployed below 6 GHz, and this frequency range is also a frequency range for deploying the LTE system. The NR FR2 provides more frequency resources for the NR system. In the NR FR2, a maximum of 800 MHz or even wider continuous frequency resources may be allocated to a single user. In contrast, in the NR FR1, a frequency resource available to a user is limited. Generally, the continuous frequency resources allocated to the single user do not exceed 200 MHz.

The NR FR2 is in the millimeter-wave frequency range. The radio frequency transceiver usually uses a phased antenna array that supports a beamforming technology, to increase an antenna gain in a specific direction. Therefore, a better equivalent radiation power and better equivalent receiving sensitivity are obtained in a specific spatial direction. Due to a spatial propagation characteristic of the millimeter-wave frequency range, an extremely high-order multi-antenna technology is not usually used for a radio frequency transceiver working in the NR FR2. Generally, two data streams are transmitted only in a vertical polarization direction and a horizontal polarization direction of a polarized antenna. In contrast, a high-order multi-antenna technology may be used for a radio frequency transceiver working in the NR FR1 to support transmission of four, eight, or more data streams.

Therefore, for a radio frequency transceiver used in a wireless communication system, a radio frequency transceiver working in the NR FR1 has a large quantity of channels, with a narrow bandwidth for a single channel, and a radio frequency transceiver working in the NR FR2 has a small quantity of channels, with a wide bandwidth for a single channel. Requirements for the radio frequency transceiver vary with a working frequency range. Different radio frequency transceivers are usually used in two different frequency ranges: the NR FR1 and NR FR2.

For example, a receiver may include a narrow bandwidth receiver (NBRX) and a wide bandwidth receiver (WBRX). The narrow bandwidth receiver may be configured to support receiving of a radio frequency signal in the NR FR1. As mentioned above, a continuous spectrum bandwidth allocated to a user in the NR FR1 is small. Therefore, a receiver circuit with a small working bandwidth may be used. In addition, a multi-antenna application or carrier aggregation application is usually required to be supported in the NR FR1. Therefore, a plurality of receive channels is required. The wide bandwidth receiver may be configured to support receiving of a radio frequency signal in the NR FR2. As mentioned above, more spectrum resources exist in the NR FR2, and continuous spectrum resources with a large bandwidth may be allocated to the user. A radio frequency receiver circuit with a larger working bandwidth needs to be used for this type of receiver. In addition, due to factors such as a channel condition of the millimeter-wave frequency range, a wide bandwidth receiver usually has a small quantity of receive channels.

A solution in which different radio frequency receivers are used in different working frequency ranges helps to simplify product design and implement a basic function quickly. However, in this solution, because different radio frequency receivers need to be separately designed and implemented, a large device size or chip area is usually required, thereby increasing hardware costs.

SUMMARY

Embodiments of this application provide a new radio frequency receiver. The radio frequency receiver multiplexes an analog-to-digital converter for a plurality of receive channels, to help reduce a device size or a chip area, and reduce hardware costs. In addition, embodiments of this application further provide a radio frequency transceiver and a wireless communication apparatus. The radio frequency transceiver and the wireless communication apparatus may include one or more radio frequency receivers.

According to a first aspect, a radio frequency receiving apparatus is provided. The radio frequency receiving apparatus is applied to a communication system. The radio frequency receiving apparatus includes a first receiver, a second receiver, an analog-to-digital converter ADC group, and a channel router. The first receiver includes a first receive channel and a second receive channel. The first receive channel includes a first down-converter, and the second receive channel includes a second down-converter. The second receiver includes a third receive channel. The third receive channel includes a third down-converter. A maximum signal bandwidth supported by the first receive channel is less than a maximum signal bandwidth supported by the third receive channel. A maximum signal bandwidth supported by the second receive channel is also less than a maximum signal bandwidth supported by the third receive channel. The analog-to-digital converter ADC group includes a plurality of ADCs including a first ADC and a second ADC. The channel router is located between a receiver and the ADC group, and is configured to separately select one or more ADCs in the ADC group for the first receiver and the second receiver. When the channel router is in a first status, the first receive channel is coupled to the first ADC, and the second receive channel is coupled to the second ADC. When the channel router is in a second status, the third receive channel is coupled to the first ADC and the second ADC. In the foregoing solution, ADC resources of the first receiver and the second receiver are multiplexed, and different ADCs are selected, by using the channel router, to be matched to the first receiver and the second receiver. Therefore, a quantity of ADCs is reduced, and a volume of the radio frequency receiving apparatus, a layout area, and costs are further reduced.

In a specific implementation, the ADC group further includes a third ADC, and when the channel router is in a third status, the first receive channel is coupled to the third ADC, and the third receive channel is coupled to the first ADC and the second ADC. The channel router is introduced, so that two ADCs that are respectively coupled to two receive channels of the first receiver may be additionally multiplexed to one receive channel of the second receiver for use. Compared with a solution in which different ADCs are respectively reserved for receive channels of different receivers, a quantity of ADCs can be reduced, thereby saving a chip area and costs. In addition, the first receiver and the second receiver may work simultaneously.

In a specific implementation, the ADC group further includes a fourth ADC. When the channel router is in a fourth status, the first receive channel is coupled to the first ADC, and the third receive channel is coupled to the second ADC and the fourth ADC. The channel router is introduced, so that two ADCs that are respectively coupled to two receive channels of the first receiver may be additionally multiplexed to one receive channel of the second receiver for use. Compared with a solution in which different ADCs are respectively reserved for receive channels of different receivers, a quantity of ADCs can be reduced, thereby saving a chip area and costs. In addition, the first receiver and the second receiver may work simultaneously.

In a specific implementation, the radio frequency receiving apparatus further includes an ADC controller coupled to the ADC group. The ADC controller is configured to equate at least two ADCs in the ADC group as a combined ADC. A maximum signal bandwidth supported by the combined ADC is greater than a maximum signal bandwidth supported by any one of the at least two ADCs. The ADC controller equates a plurality of ADCs as one combined ADC, to meet a wide bandwidth requirement of the second receiver.

In a specific implementation, the ADC controller is configured to provide a clock signal for each of the at least two ADCs. Frequencies of clock signals corresponding to different ADCs of the at least two ADCs are the same. Phases of the clock signals corresponding to different ADCs of the at least two ADCs are interleaved. A plurality of ADCs is equivalent to one ADC through phase interleaving.

In a specific implementation, the channel router is a combination of a plurality of switches. ADCs in the ADC group are matched to the first receiver and the second receiver by using a switch combination.

In a specific implementation, the channel router is a multiplexer. ADCs in the ADC group are matched to the first receiver and the second receiver by using the multiplexer.

In a specific implementation, the switch combination includes a plurality of single-pole double-throw switches. The ADCs in the ADC group are matched to the first receiver and the second receiver by using the single-pole double-throw switches.

In a specific implementation, any ADC in the ADC group is a narrow bandwidth ADC.

In a specific implementation, when the first receive channel and the second receive channel are configured to respectively receive a first carrier and a second carrier, the channel router is configured to be in the first status. Both the first carrier and the second carrier belong to a first frequency range of a 5G communication system.

Alternatively, when the third receive channel is configured to receive a third carrier, the channel router is configured to be in the second status. The third carrier belongs to a second frequency range of the 5G communication system. Different communication requirements for a wide bandwidth and a narrow bandwidth can be met.

In a specific implementation, the first carrier and the second carrier are two carriers that can enable carrier aggregation, or may be two carriers of dual connectivity (DC).

In a specific implementation, both the first carrier and the second carrier may belong to an LTE system or another wireless communication system; or the first carrier belongs to a frequency range of a 5G communication system, and the second carrier belongs to a frequency range of the LTE system.

In a specific implementation, when the first receive channel and the second receive channel are configured to respectively receive a first carrier and a second carrier, and the third receive channel is configured to receive a third carrier, the channel router is configured to be in the third status or fourth status. Both the first carrier and the second carrier belong to a first frequency range of a 5G communication system, and the third carrier belongs to a second frequency range of the 5G communication system. Wide bandwidth reception and narrow bandwidth reception can be implemented.

According to a second aspect, a radio frequency receiving apparatus is provided. The radio frequency receiving apparatus includes: a narrow bandwidth receiver, including a plurality of narrow bandwidth receive channels that includes a first receive channel and a second receive channel; a wide bandwidth receiver, including one or more wide bandwidth receive channels that include a third receive channel, where a maximum signal bandwidth supported by each of the wide bandwidth receive channels is greater than a maximum signal bandwidth supported by each of the narrow bandwidth receive channels; an analog-to-digital converter ADC group, including a plurality of ADCs that includes a first ADC and a second ADC; and an ADC channel router, configured to separately select one or more ADCs in the ADC group for the narrow bandwidth receiver and the wide bandwidth receiver. When the ADC channel router is in a first status, the first receive channel is coupled to the first ADC, and the second receive channel is coupled to the second ADC. When the ADC channel router is in a second status, the third receive channel is coupled to the first ADC and the second ADC. In the foregoing solution, ADC resources of the first receiver and the second receiver are multiplexed, and different ADCs are selected, by using the channel router, to be matched to the first receiver and the second receiver. Therefore, a quantity of ADCs is reduced, and a volume of the radio frequency receiving apparatus, a layout area, and costs are further reduced.

In a specific implementation, the narrow bandwidth receiver includes N1 receive channels including a first receive channel to an N1$^{th}$ receive channel. The wide bandwidth receiver includes two receive channels including an (N1+1)$^{th}$ receive channel to an (N1+2)$^{th}$ receive channel. A plurality of ADCs in the analog-to-digital converter ADC group is divided into a first group of ADCs to a second group of ADCs, and each ADC group includes at least two ADCs. When the ADC channel router is in a first status, the first receive channel to the $N1^{th}$ receive channel are coupled to the plurality of ADCs in a one-to-one correspondence. When the ADC channel router is in a second status, the $(N1+1)^{th}$ receive channel is coupled to an ADC in the first group of ADCs, and the (N1+2)th receive channel is coupled to an ADC in the second group of ADCs. N1 is a natural number, and N1≥3. The channel router is introduced, so that ADCs that are respectively coupled to receive channels of the first receiver may be additionally multiplexed to one receive channel of the second receiver for use. Compared with a solution in which different ADCs are respectively reserved for receive channels of different receivers, a quantity of ADCs can be reduced, thereby saving a chip area and costs. In addition, the first receiver and the second receiver may work simultaneously.

In a specific implementation, when the ADC channel router is in a third status, the first receive channel to an $M^{th}$ receive channel are in a one-to-one correspondence with ADCs in the first group of ADCs. The $(N1+2)^{th}$ receive channel is coupled to the second group of ADCs. M<N1+2, and M is a natural number greater than 2.

In a specific implementation, when the ADC channel router is in a fourth status, the $(M+1)^{th}$ receive channel to the $(N1)^{th}$ receive channel are in a one-to-one correspondence with ADCs in the second group of ADCs. The $(N1+1)^{th}$ receive channel is coupled to the first group of ADCs. M<N1+2, and M is a natural number greater than 2.

In a specific implementation, the radio frequency receiving apparatus further includes an ADC controller coupled to the ADC group. The ADC controller is configured to equate at least two ADCs in the ADC group as a combined ADC. A maximum signal bandwidth supported by the combined ADC is greater than a maximum signal bandwidth supported by any one of the at least two ADCs. The ADC controller equates a plurality of ADCs as one combined ADC, to meet a wide bandwidth requirement of the second receiver.

In a specific implementation, the ADC controller is configured to provide a clock signal for each of the at least two ADCs. Frequencies of clock signals corresponding to different ADCs of the at least two ADCs are the same. Phases of the clock signals corresponding to different ADCs of the at least two ADCs are interleaved. A plurality of ADCs is equivalent to one ADC through phase interleaving.

In a specific implementation, the channel router is a combination of a plurality of switches. ADCs in the ADC group are matched to the first receiver and the second receiver by using a switch combination.

In a specific implementation, the channel router is a multiplexer. ADCs in the ADC group are matched to the first receiver and the second receiver by using the multiplexer.

In a specific implementation, the switch combination includes a plurality of single-pole double-throw switches. The ADCs in the ADC group are matched to the first receiver and the second receiver by using the single-pole double-throw switches.

In a specific implementation, any ADC in the ADC group is a narrow bandwidth ADC.

In a specific implementation, when the first receive channel and the second receive channel are configured to respectively receive a first carrier and a second carrier, the channel router is configured to be in the first status. Both the first carrier and the second carrier belong to a first frequency range of a 5G communication system.

Alternatively, when the third receive channel is configured to receive a third carrier, the channel router is configured to be in the second status. The third carrier belongs to a second frequency range of the 5G communication system. Different communication requirements for a wide bandwidth and a narrow bandwidth can be met.

In a specific implementation, the first carrier and the second carrier are two carriers that can enable carrier aggregation, or may be two carriers of dual connectivity (DC).

In a specific implementation, both the first carrier and the second carrier may belong to an LTE system or another wireless communication system; or the first carrier belongs to a frequency range of a 5G communication system, and the second carrier belongs to a frequency range of the LTE system.

In a specific implementation, when the first receive channel and the second receive channel are configured to respectively receive a first carrier and a second carrier, and the third receive channel is configured to receive a third carrier, the channel router is configured to be in the third status or fourth status. Both the first carrier and the second carrier belong to a first frequency range of a 5G communication system, and the third carrier belongs to a second frequency range of the 5G communication system. Wide bandwidth reception and narrow bandwidth reception can be implemented.

According to a third aspect, a millimeter-wave antenna module is provided. The millimeter-wave antenna module includes the radio frequency receiving apparatus according to any one of the foregoing and an antenna. Each receive channel of the first receiver and the second receiver is correspondingly connected to one antenna. In the foregoing solution, ADC resources of the first receiver and the second receiver are multiplexed, and different ADCs are selected, by using the channel router, to be matched to the first receiver and the second receiver. Therefore, a quantity of ADCs is reduced, and a volume of the radio frequency receiving apparatus, a layout area, and costs are further reduced.

According to a fourth aspect, a chip module is provided. The chip module includes the radio frequency receiving apparatus according to any one of the foregoing and a baseband processing apparatus. Each receive channel of the first receiver and the second receiver is connected to the baseband processing apparatus. In the foregoing solution, ADC resources of the first receiver and the second receiver are multiplexed, and different ADCs are selected, by using the channel router, to be matched to the first receiver and the second receiver. Therefore, a quantity of ADCs is reduced, and a volume of the radio frequency receiving apparatus, a layout area, and costs are further reduced.

According to a fifth aspect, a wireless communication apparatus is provided, including a housing and the radio frequency receiving apparatus, according to any one of the foregoing, disposed in the housing. In the foregoing technical solution, ADC resources of the first receiver and the second receiver are multiplexed, and different ADCs are selected, by using the channel router, to be matched to the first receiver and the second receiver, thereby reducing a quantity of ADCs, further reducing a volume of the radio frequency receiving apparatus and a layout area, and reducing costs.

It should be understood that, in the solution provided in this application, the wireless communication apparatus may be a wireless communication device, or some components in the wireless communication device, for example, a radio frequency component, a radio frequency chip, a chip combination, or an integrated circuit product such as a module including a chip. The wireless communication device may be a computer device that supports a wireless communication function.

Specifically, the wireless communication device may be a terminal such as a smartphone, or may be a radio access network device such as a base station. In terms of functions, chips for wireless communication may be classified into a baseband chip and a radio frequency chip. The baseband chip is also referred to as a modem or a baseband processing chip. The radio frequency chip is also referred to as a transceiver chip, a radio frequency transceiver, or a radio frequency processing chip. Therefore, the wireless communication apparatus may be a single chip, or may be a combination of a plurality of chips, for example, a system chip, a chip platform, or a chipset.

The system chip is also referred to as a system on a chip (SoC), or referred to as a SoC chip for short. It may be understood that a plurality of chips is packaged together to form a larger chip. For example, the baseband chip may further be packaged in the SoC chip. The chip platform or the chipset may be understood as a plurality of chips that needs to be used together. The plurality of chips is usually independently packaged, but the chips need to cooperate with each other during operation to jointly complete a wireless communication function. For example, the baseband chip (or the SoC chip integrated with the baseband chip) and the radio frequency chip are usually independently packaged, but need to be used together.

DETAILED DESCRIPTION OF ILLUSTRATIVE EMBODIMENTS

The following further describes technical solutions provided in this application with reference to the accompanying drawings and embodiments. It should be understood that a system structure and a service scenario provided in embodiments of this application are mainly intended to explain some possible implementations of the technical solutions in this application, and should not be construed as a unique limitation on the technical solutions in this application. A person of ordinary skill in the art may know that, as a system evolves and an updated service scenario emerges, the technical solutions provided in this application still apply to same or similar technical problems.

Figure 1:
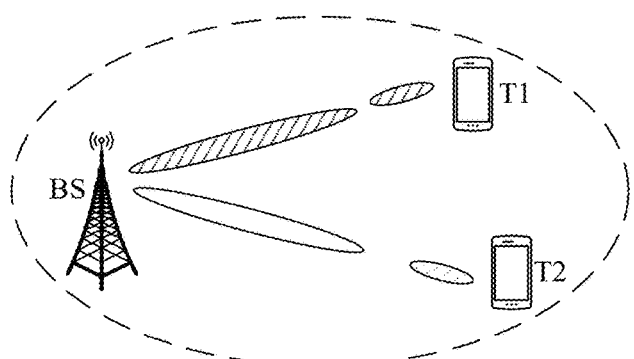
FIG. 1 is a schematic diagram of a structure of a wireless communication system according to an embodiment of this application.

FIG. 1 is a schematic diagram of a structure of a wireless communication system according to an embodiment of this application. The wireless communication system includes at least one base station (BS) and at least one terminal. As shown in FIG. 1, one base station denoted as BS, and two terminals denoted as T1 and T2, are shown in the wireless communication system.

The base station is generally owned by an operator or an infrastructure provider, and is operated or maintained by the operator and infrastructure providers. The base station may provide communication coverage for a specific geographical area by using an integrated or external antenna. One or more terminals in a communication coverage range of the base station may be connected to the base station. The base station may also be referred to as a wireless access point (AP), or a transmission reception point (TRP). Specifically, the base station may be a universal next-generation node-B (gNB) in a 5G new radio (NR) system or an evolved universal terrestrial radio access (eNB) in a 4G long term evolution (LTE) system.

The terminal is more closely related to a user, and is also called user equipment (UE), a subscriber unit (SU), or customer-premises equipment (CPE). Compared with a base station that is usually placed in a fixed location, the terminal usually moves with the user, and is sometimes referred to as a mobile station (MS). In addition, some network devices such as a relay node (RN), may also sometimes be considered as terminals because the network devices have a UE identity or belong to the user. Specifically, the terminal may include a mobile phone, a tablet computer, a laptop computer, a wearable device (such as a watch, a band, a helmet, and glasses), other devices that have a wireless access capability, such as a car, a mobile wireless router, and various internet of things (IoT) devices, including smart home devices (such as a meter and a household appliance) and smart city devices (such as a surveillance camera and a street lamp).

It should be understood that the wireless communication system may also include another quantity of terminals and another quantity of base stations. In addition, the wireless communication system may further include another network device, such as a core network device. The wireless communication system may comply with a wireless communication standard in the $3^{rd}$ generation partnership project (3GPP), or may comply with another wireless communication standard, such as the 802 series (for example, 802.11, 802.15, or 802.20) wireless communication standards of the Institute of Electrical and Electronics Engineers (IEEE).

In this embodiment of this application, the terminal and the base station should know predefined configurations of the wireless communication system, including a radio access technology (RAT) supported by the system and a configuration of a radio resource stipulated by the system, such as a radio frequency range and a basic configuration of a carrier. The configurations predefined by the system may be used as a part of a standard protocol for the wireless communication system, or may be determined through interaction between the terminal and the base station. Content of a related standard protocol may be prestored in memories of the terminal and the base station, or reflected as hardware circuits or software code of the terminal and the base station.

For example, the base station and the terminal each are equipped with one or more antennas, and communicate with each other by using a radio electromagnetic wave as a transmission medium. When the radio resource specified in the system includes a millimeter-wave frequency range, the base station and the terminal each may be equipped with an antenna array. The antenna array includes a plurality of antennas, and can support a beamforming technology, thereby reducing signal transmission losses, increasing a signal-to-noise ratio, and improving wireless communication performance.

Figure 2:
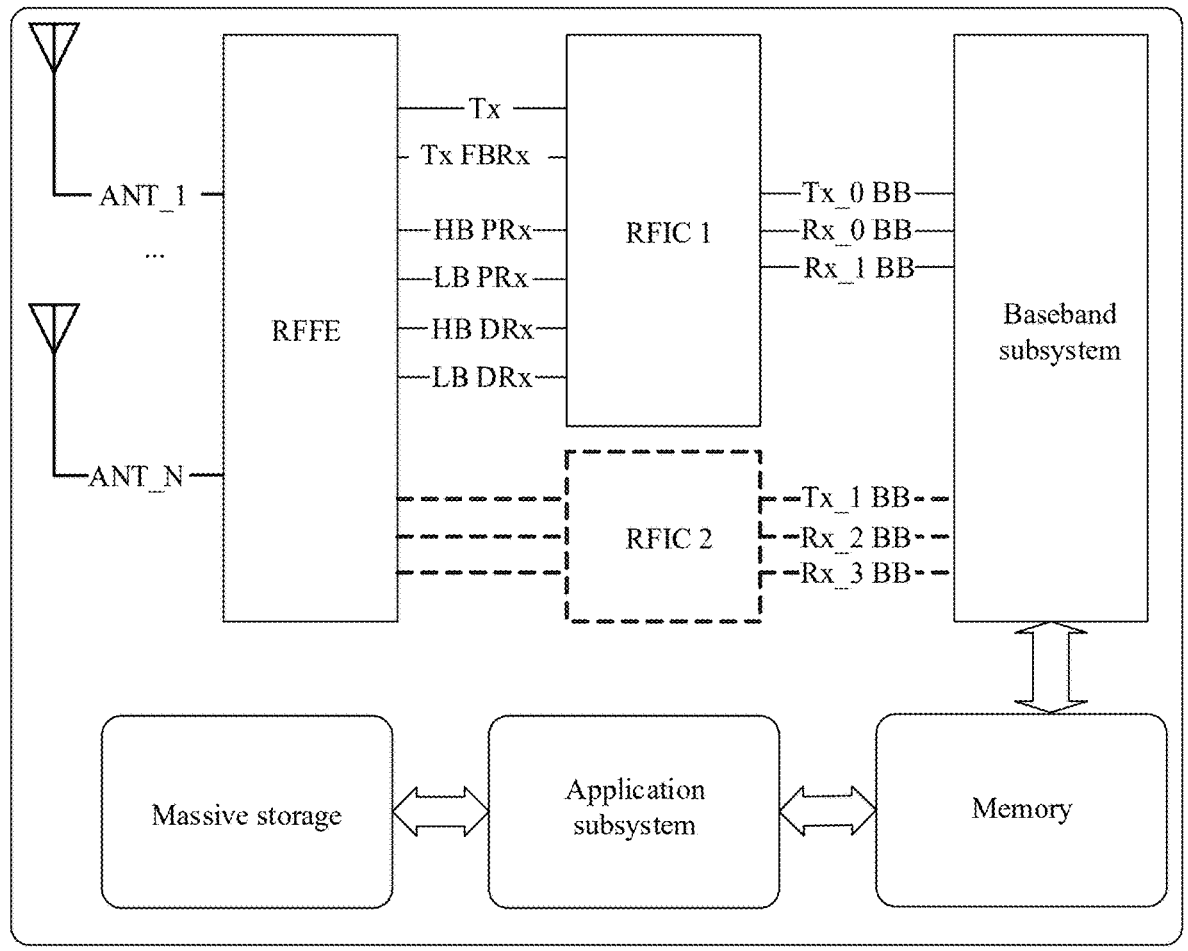
FIG. 2 is a schematic diagram of a structure of a wireless communication device according to an embodiment of this application.

FIG. 2 is a schematic diagram of a structure of a wireless communication device according to an embodiment of this application. The wireless communication device may be a terminal or base station in this embodiment of this application. As shown in FIG. 2, the wireless communication device may include an application subsystem, a memory, a massive storage, a baseband subsystem, a radio frequency integrated circuit (RFIC), a radio frequency front end (RFFE) component, and an antenna (ANT). These components may be coupled to each other through various interconnection buses or in other electric connection manners.

In FIG. 2, ANT_1 represents a first antenna, and ANT_N represents an $N^{th}$ antenna. N is a positive integer greater than 1. Tx represents a transmit channel, and Rx represents a receive channel. Different numbers represent different channels. FBRx represents a feedback receive channel, PRx represents a primary receive channel, and DRx represents a diversity receive channel. HB represents a high band, LB represents a low band, and HB or LB indicates that a frequency is comparatively high or low. BB represents a baseband. It should be understood that marks and components in FIG. 2 are merely examples, and this embodiment of this application further includes another implementation.

The application subsystem may be used as a main control system or a main computing system of the wireless communication device, and is configured to: run a main operating system and an application, manage software and hardware resources of the entire wireless communication device, and provide a user operation interface for a user. The application subsystem may include one or more processing cores, and may execute application software of the wireless communication device and driver software related to another subsystem (for example, a baseband subsystem). The baseband subsystem may also include one or more processing cores, a hardware accelerator (HAC), a cache, and the like, and may execute some program software of the baseband subsystem, and complete a baseband signal processing function.

In FIG. 2, the RFFE component and an RFIC 1 (and optionally an RFIC 2) may be jointly included in a radio frequency subsystem. The radio frequency subsystem may be further divided into a radio frequency (RF) receive channel and radio frequency (RF) transmit channel. The radio frequency receive channel may receive a radio frequency signal through an antenna, perform processing (such as amplification, filtering, and down-conversion) on the radio frequency signal to obtain a baseband signal, and transfer the baseband signal to the baseband subsystem. The radio frequency transmit channel may receive the baseband signal from the baseband subsystem, perform radio frequency processing (such as up-conversion, amplification, and filtering) on the baseband signal to obtain a radio frequency signal, and finally radiate the radio frequency signal into space through the antenna. Specifically, the radio frequency subsystem may include electronic components such as an antenna switch, an antenna tuner, a low noise amplifier (LNA), a power amplifier (PA), a mixer, a local oscillator (LO), and a filter. The electronic components may be integrated into one or more chips as required. The antenna may also sometimes be considered as a part of the radio frequency subsystem.

The baseband subsystem may extract useful information or data bits from the baseband signal, or convert the information or data bits into a to-be-sent baseband signal. The information or the data bits may be data that represents user data or control information such as a voice, a text, or video. For example, the baseband subsystem may implement modulation and demodulation, encoding and decoding, and other signal processing operations. Different radio access technologies, such as 5G NR and 4G LTE, usually have different baseband signal processing operations. Therefore, the baseband subsystem may include a plurality of processing cores or a plurality of HACs, to support convergence of a plurality of mobile communication modes.

It should be understood that in this embodiment of this application, the processing core may represent a processor; and the processor may be a general-purpose processor, or may be a processor designed for a specific field. For example, the processor may be a central processing unit (CPU), or may be a digital signal processor (DSP). Alternatively, the processor may be a micro control unit (MCU), a graphics processing unit (GPU), an image signal processor (ISP), an audio signal processor (ASP), or a processor dedicated to artificial intelligence (AI) application. The AI processor includes but is not limited to a neural network processing unit (NPU), a tensor processing unit (TPU), and a processor referred to as an AI engine.

The memory may be classified into a volatile memory and a non-volatile memory (NVM). The volatile memory is a memory in which data stored in the memory is lost after a power supply is interrupted. Currently, volatile memories are mainly random access memories (RAM), including a static random access memory (SRAM) and a dynamic random access memory (DRAM). The non-volatile memory is a memory in which data stored in the memory is not lost even if a power supply is interrupted. Common non-volatile memories include a read only memory (ROM), an optical disc, a magnetic disk, various memories based on a flash memory technology, and the like. Usually, the volatile memory may be used as the memory, and the non-volatile memory, for example, the magnetic disk or a flash memory, may be used as the massive storage.

In this embodiment of this application, the baseband subsystem and the radio frequency subsystem are jointly included in a communication subsystem, to provide a wireless communication function for the wireless communication device. Usually, the baseband subsystem is responsible for managing software and hardware resources of the communication subsystem, and may configure a working parameter of the radio frequency subsystem. The one or more processing cores of the baseband subsystem may be integrated into one or more chips, and the chip may be referred to as a baseband processing chip or a baseband chip. Similarly, the RFIC may be referred to as a radio frequency processing chip or a radio frequency chip. In addition, with evolution of technologies, function division of the radio frequency subsystem and the baseband subsystem in the communication subsystem may alternatively be adjusted. For example, some functions of the radio frequency subsystem are integrated into the baseband subsystem, or some functions of the baseband subsystem are integrated into the radio frequency subsystem.

In this embodiment of this application, the radio frequency subsystem may include an independent antenna, an independent radio frequency front-end component, and an independent radio frequency chip. The radio frequency chip is sometimes referred to as a receiver, a transmitter, or a transceiver. The antenna, the radio frequency front-end component, and the radio frequency processing chip each may be manufactured and sold separately. Certainly, the radio frequency subsystem may use different components or different integration manners based on requirements for power consumption and performance. For example, some components belonging to the radio frequency front-end are integrated in a radio frequency chip. In addition, the antenna, the radio frequency front-end component and the radio frequency chip may be integrated into a same module, which is referred to as a radio frequency antenna module, a millimeter-wave antenna module, or an antenna module.

Figure 3:
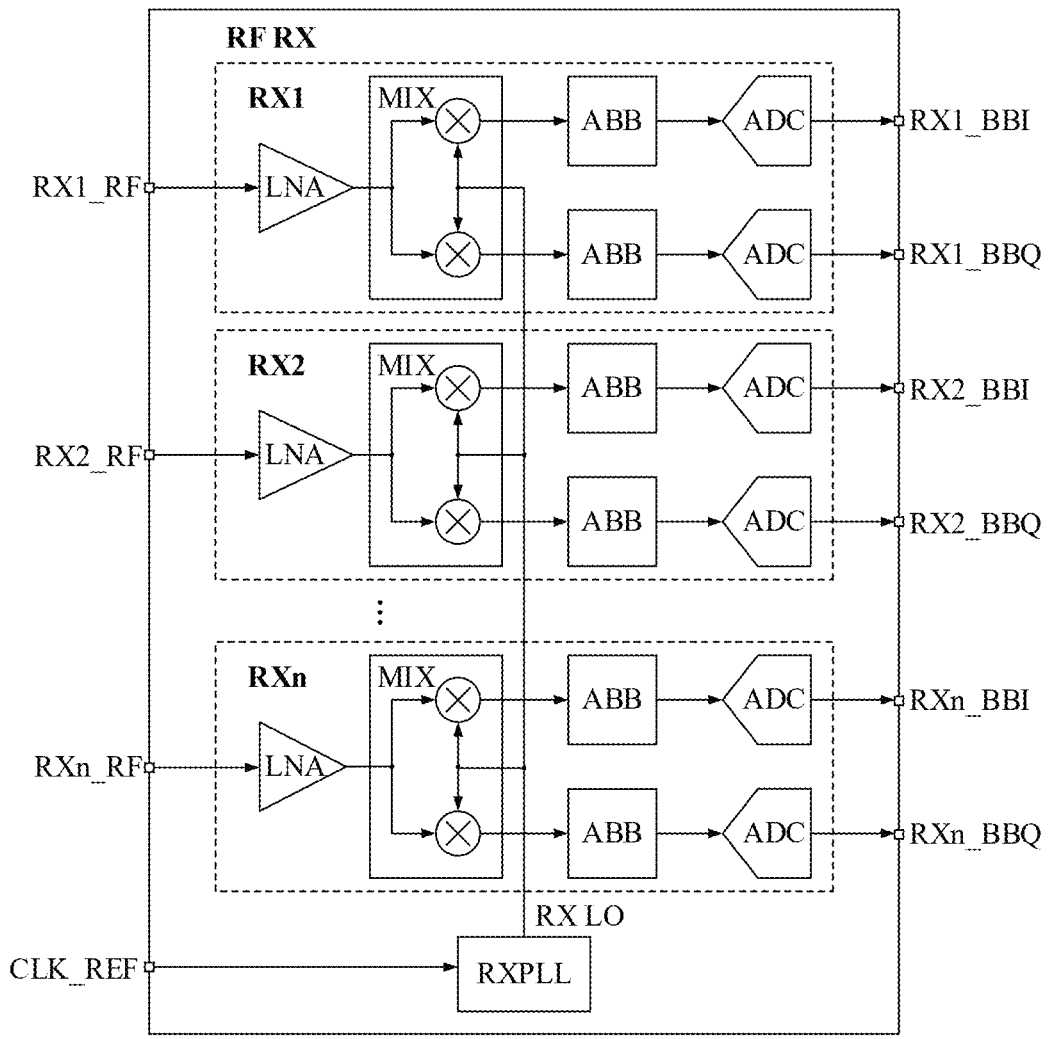
FIG. 3 is a schematic diagram of a radio frequency receiving apparatus in the current technology.

In FIG. 3, a receiver of a radio frequency receiving apparatus in an embodiment of this application is usually configured to support a Multi-Input Multi-Output multi-input multi-output (MIMO) technology or a digital beam-forming technology. In the radio frequency receiving apparatus shown in FIG. 3, n receivers are used, and n is a natural number. The n transceivers are respectively an RX1, an RX2, . . . , and an RXn. Theoretically, the n transceivers can support simultaneous operation of n receive antennas. However, in the MIMO technology, a plurality of antennas works in a same carrier frequency. Therefore, in the radio frequency receiving apparatus shown in FIG. 3, n RX channels use a same phase locked loop (RXPLL) to provide a local oscillator signal (RX LO) required by each RX channel. Space division multiplexing of a radio resource is implemented by using the MIMO technology. That is, a plurality of channels of data is transmitted simultaneously in a same spatial environment, thereby increasing an overall data throughput rate.

A characteristic of the phase locked loop is: using an externally input reference signal to control a frequency and a phase of an oscillation signal inside a loop. Because the phase locked loop can implement automatic tracking of a frequency of an input signal by a frequency of an output signal, the phase locked loop is usually used for a closed-loop tracking circuit. A name of the phase locked loop origins from the following: when the frequency of the output signal is equal to the frequency of the input signal during working of the phase locked loop, a phase difference between an output voltage and an input voltage is fixed, that is, a phase of the output voltage and a phase of the input voltage are locked. The phase locked loop usually includes three parts: a phase detector (PD), a loop filter (LF), and a voltage controlled oscillator (VCO). The phase detector in the phase locked loop is also called a phase comparator. The phase detector detects a phase difference between the input signal and the output signal, and converts a detected phase difference signal into a uD(t) voltage signal for output. After the signal is filtered by a low pass filter, a control voltage uC(t) of the voltage controlled oscillator is formed for controlling a frequency of a signal output by the oscillator.

To make more efficient use of a spectrum resource and obtain a higher throughput, a carrier aggregation (CA) technology is introduced in an LTE system and an NR system. The carrier aggregation technology may aggregate two to five LTE component carriers to implement a maximum transmission bandwidth of 100 MHz, thereby effectively increasing an uplink transmission rate and a downlink transmission rate. Through the carrier aggregation technology, more radio spectrum resources may be allocated to a user, and a throughput may be increased.

Based on the CA technology, a communication network may allocate one or more carrier components (CC) to the user according to a requirement of the user for a traffic volume. Spectrum resources owned by a wireless operator are usually discontinuous or even located in different frequency bands. To maximize integration of the spectrum resources, the 3GPP defines inter-band carrier aggregation (CA). That is, some carrier components are scheduled in different frequency bands and are combined to serve one terminal user.

Figure 4:
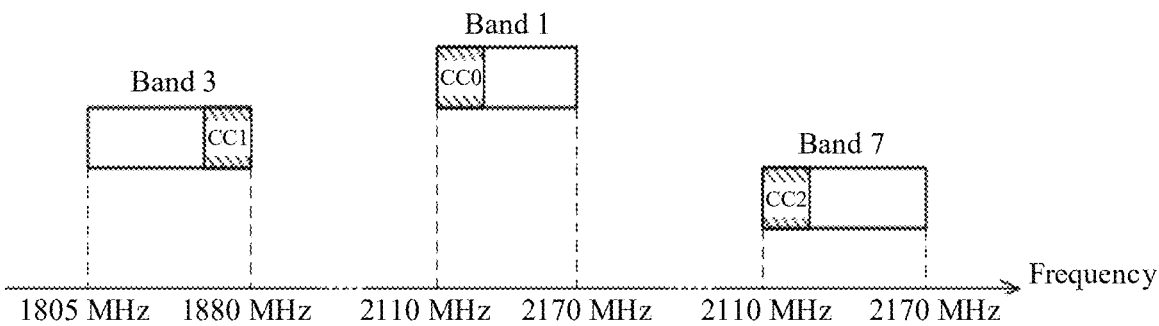
FIG. 4 is a schematic diagram of deployment of downlink inter-band carrier aggregation.

FIG. 4 shows a deployment example of downlink inter-band carrier aggregation. In this example, a system separately allocates one carrier component to a terminal in each of three frequency bands: Band 1 (2,110 MHz to 2,170 MHz), Band 3 (1,805 MHz to 1,880 MHz), and Band 7 (2,110 MHz to 2,170 MHz). The carrier components are CC0, CC1, and CC2 respectively. Assuming that bandwidths of the three carrier components are all 20 MHz, through the foregoing deployment of inter-band carrier aggregation, a terminal user may obtain spectrum resources of 60 MHz in total.

To support application of the inter-band carrier aggregation, a radio frequency chip needs to have a capability of simultaneously receiving the three carrier components in FIG. 4. Because the three carrier components are in different frequency bands, and due to limitation on frequency bandwidth characteristics of a radio frequency front-end module and a radio frequency receiver circuit, a plurality of radio frequency receivers that works in parallel is generally required to receive the carrier components respectively. Taking a carrier aggregation scenario of three frequency bands shown in FIG. 4 as an example, three receiver circuits need to work simultaneously to receive three carrier components respectively. In a carrier aggregation scenario with more frequency bands, a quantity of receive channels also need to be increased correspondingly.

Figure 5:
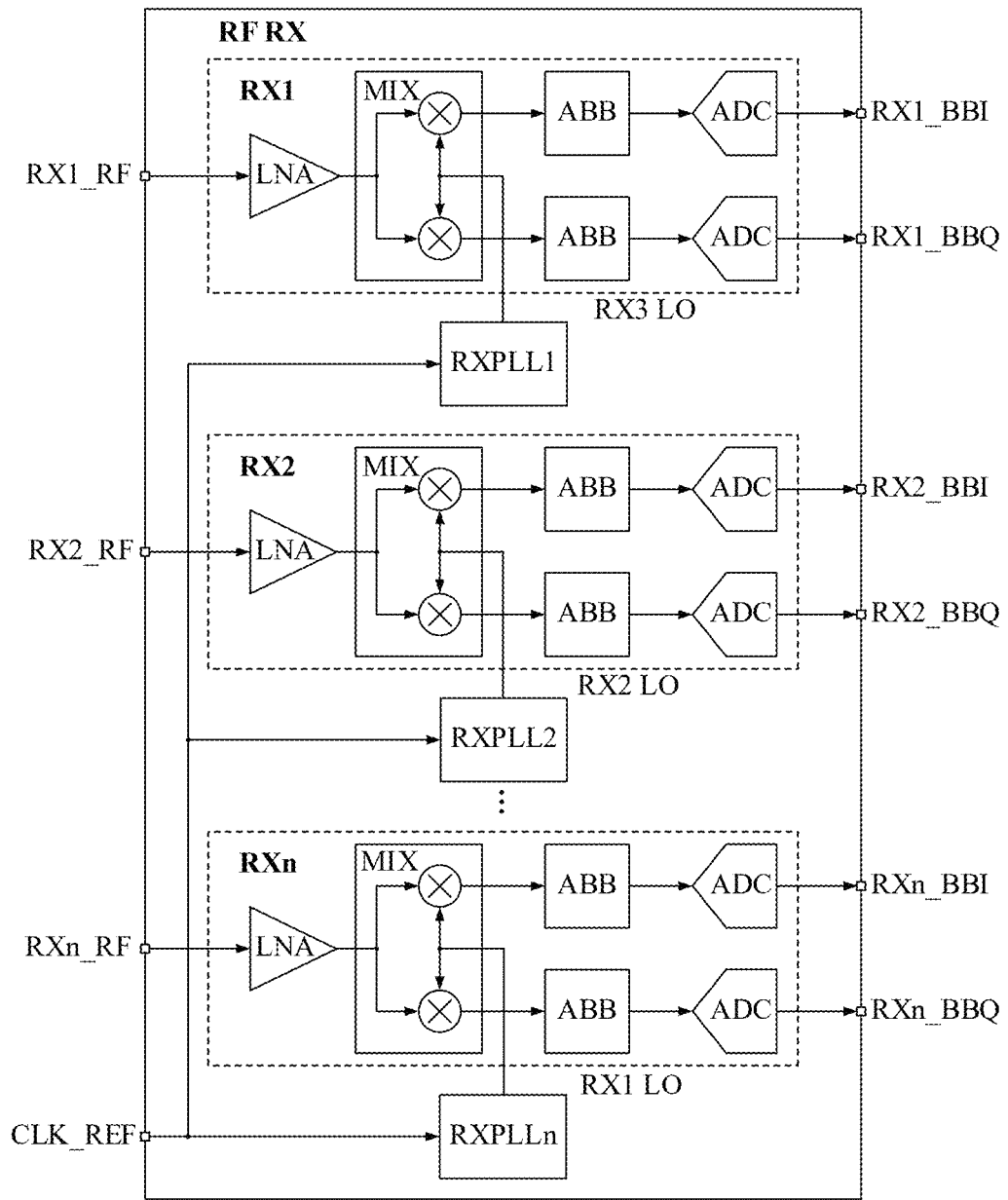
FIG. 5 is a schematic diagram of a structure of a radio frequency receiving apparatus supporting a carrier aggregation application.

FIG. 5 shows a radio frequency receiving apparatus supporting a carrier aggregation application. In this radio frequency receiving apparatus, n receive channels are provided to separately receive carrier components deployed in n different frequency ranges. For example, to support the inter-band CA application in the three frequency ranges shown in FIG. 4, the radio frequency receiving apparatus needs to provide at least three receive channels (RX1 to RX3), that is, n>3. Different from the radio frequency receiving apparatus supporting a multi-antenna application shown in FIG. 3, in the carrier aggregation application, each carrier component is deployed in different carrier frequencies. Therefore, each receive channel needs an independent phase locked loop to provide a local oscillator signal required by each receive channel.

As shown in FIG. 3 and FIG. 5, both the inter-band carrier aggregation and MIMO application impose a specific requirement on a quantity of receive channels and a quantity of transmitter channels of a radio frequency chip receiver. When the two technologies are combined to improve performance of a communication system, a higher requirement is imposed on a quantity of receive channels and a quantity of transmit channels of a radio frequency chip. Taking a typical scenario of combination of downlink inter-band carrier aggregation with MIMO as an example, it is assumed that a communication capability required by a system is inter-band 3CC aggregation and 4×4 MIMO, that is, it is required that all three carrier components in different frequency bands can support the 4×4 MIMO. As described above, a total of 12 receive channels are required to support the communication capability of this specification.

In an LTE, spectrum resources deployed in the system are all within a frequency range below 6 GHz. Because the spectrum resources below 6 GHz are extremely precious, resources in the frequency range are almost exhausted in some countries and regions. Therefore, in an emerging NR (new radio, generally referred to as a 5G communication system) communication system, to obtain more spectrum resources and support a larger communication bandwidth requirement, a millimeter-wave frequency range is introduced. In an NR system, to distinguish between a frequency range below 6 GHz and the millimeter-wave frequency range, an NR FR1 (New Radio Frequency Range-1, a frequency range 1 in the 5G communication system) and an NR FR2 (New Radio Frequency Range 2, a frequency range 2 in the 5G communication system) are respectively defined. In this embodiment of this application, the NR FR1 is a first frequency range, and the NR FR2 is a second frequency range. The NR FR1 and the NR FR2 are as follows:

TABLE 1

| Definition of Frequency Ranges in the NR System | |
|---|---|
| Definition of an NR | Frequency range |
| FR1 | 450 MHz to 6,000 MHz |
| FR2 | 24,250 MHz to 52,600 MHz |

As shown in the foregoing table, the NR FR1 is deployed below 6 GHz, and the frequency range is also a frequency range for deployment of an LTE. The NR FR2 provides more spectrum resources for wireless communication. In the NR FR2, a maximum of 800 MHz or even a wider continuous spectrum resource may be allocated to a single user. In contrast, in the NR FR1, a spectrum resource available to the user is limited. Generally, a continuous spectrum resource allocated to the single user does not exceed 200 MHz.

The NR FR2 works in the millimeter-wave frequency range, and a beamforming technology is usually used, to increase an antenna gain in a specific direction through a phased antenna array. Therefore, a better equivalent radiation power and better equivalent receiving sensitivity are obtained in a specific spatial direction. Due to limitation on space propagation of a millimeter wave, an extremely high-order multi-antenna technology is not used in the FR2. Generally, two data streams are transmitted only in a vertical polarization direction and a horizontal polarization direction of a polarized antenna.

To sum up, the following table compares radio frequency receiving apparatuses used in a wireless communication system.

TABLE 2

| Comparison Between Receiver Characteristics in the FR1 and FR2 | | |
|---|---|---|
| Receiver characteristic | LTE and NR FR1 | NR FR2 |
| Channel bandwidth | A bandwidth of a single channel is narrow | A bandwidth of a single channel is wide |
| A quantity of channels | Support a high-order MIMO or inter-band CA application, with a large quantity of channels | Support transmission of only two data streams of an antenna in a vertical polarization direction and a horizontal polarization direction, with a small quantity of receive channels |

As shown in the foregoing table, for wireless communication in different frequency ranges, requirements for a receiver are different because channels have different capabilities.

As described above, two frequency ranges, NR FR1 and NR FR2 are introduced in an emerging NR communication system. In the two frequency ranges, signal characteristics of a receiver are different, and communication scenarios are also different. Therefore, requirements for a radio frequency receiver are different.

Figure 6:
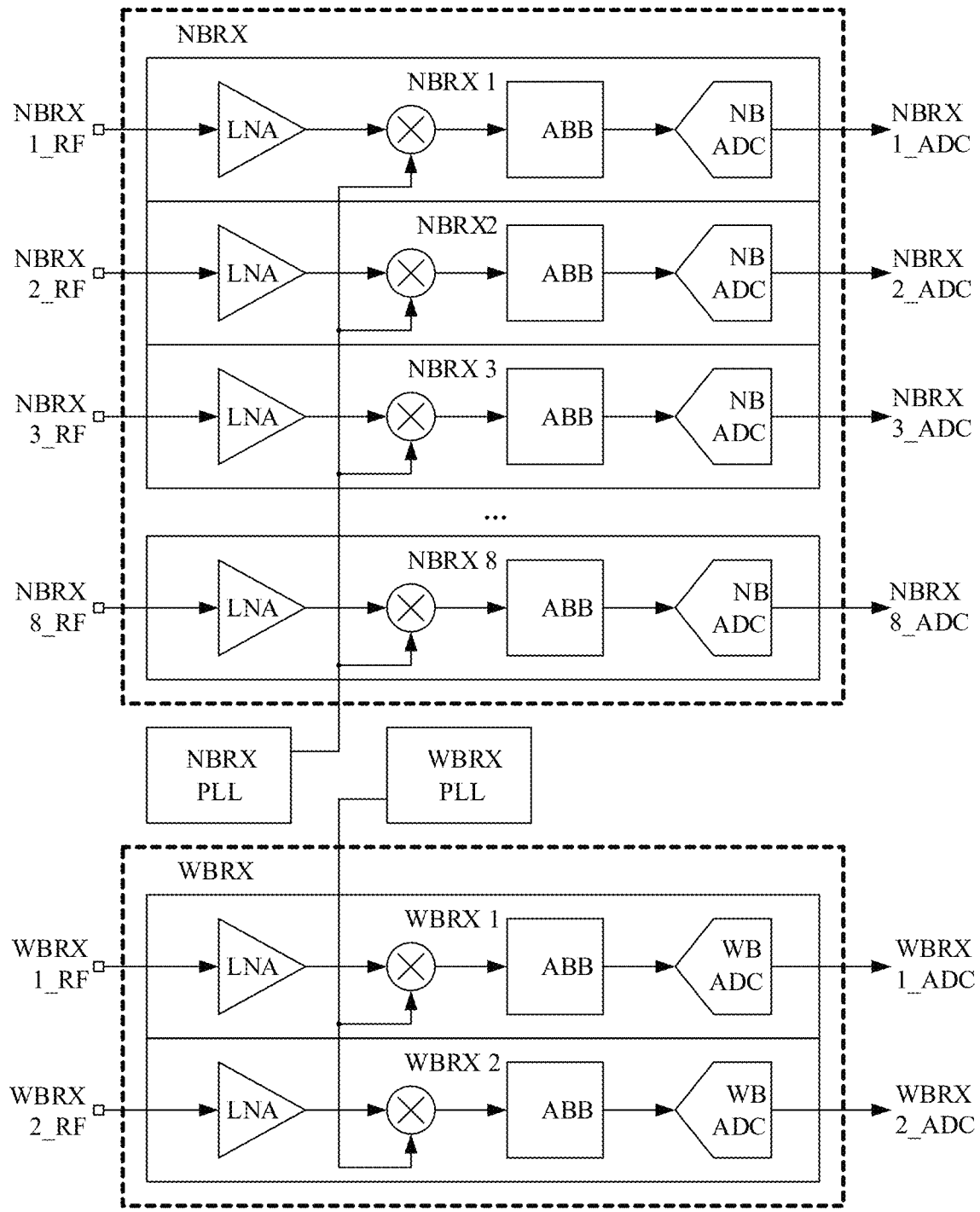
FIG. 6 shows that a zero intermediate frequency architecture is used in an NBRX circuit and a WBRX circuit.

In FIG. 6, for a radio frequency receiver that needs to support both an NR FR1 and NR FR2, a radio frequency receiving apparatus integrates the following two types of transmitters.

(1) A narrow bandwidth receiver (NBRX). This type of receiver is configured to receive a radio frequency signal in the NR FR1. As mentioned above, a continuous spectrum bandwidth allocated to a user in the NR FR1 is small. Therefore, a receiver circuit with a small bandwidth may be used. In addition, a multi-antenna application or carrier aggregation application is usually required to be supported in the NR FR1. Therefore, a plurality of receive channels is required. In a receiver example shown in FIG. 6, eight same NBRX channels (NBRX1 to NBRX8) are integrated, to support a maximum 8×8 MIMO application in the NR FR1. In actual application, more NBRX receive channels may be integrated, to support a more complex carrier aggregation and multi-antenna combination application.

(2) A wide bandwidth receiver (WBRX). This type of receiver is configured to receive a radio frequency signal in the NR FR2. As mentioned above, more spectrum resources exist in the NR FR2, and continuous spectrum resources with a large bandwidth may be allocated to the user. A radio frequency receiver circuit with a larger bandwidth needs to be used for this type of receiver. In addition, due to factors such as a channel condition of a millimeter-wave frequency range, the NR FR2 has a small quantity of channels. In the receiver example shown in FIG. 6, two WBRX channels (WBRX1 and WBRX2) are integrated, to support receiving of signal streams in a vertical polarization direction and horizontal polarization direction of a high-frequency antenna array.

A zero intermediate frequency architecture is used in an NBRX circuit and a WBRX circuit in FIG. 6. For ease of description, the circuit architecture in this figure is simplified. In fact, the receiver in FIG. 6 and the receiver shown in FIG. 5 have same channels, and implement baseband output in an orthogonal I/Q sub-channel. Because circuit structures of an I sub-channel and a Q sub-channel are the same, the I sub-channel and Q sub-channel are simplified as one sub-channel in FIG. 6 for description. As shown in FIG. 6, because signal characteristics of the NR FR1 and NR FR2 are different, a conventional receiver that supports an NR FR1 architecture and an NR FR2 architecture needs to integrate two different types of receiver circuits simultaneously, to respectively process a narrow bandwidth signal of the NR FR1 and a wide bandwidth signal of the NR FR2.

A main problem in this solution is that a narrow bandwidth receiver circuit that supports the NR FR1 and a wide bandwidth receiver circuit that supports the NR FR2 need to be integrated simultaneously. The two types of circuits are designed separately, and occupy a large chip area. In particular, because a processing capability of a baseband is usually limited, receiving in two frequency ranges, NR FR1 and NR FR2 are not required to be supported simultaneously. In other words, receiving with a maximum bandwidth capability in the two frequency ranges are not required to be performed simultaneously.

The present invention provides a reconfigurable radio frequency receiving apparatus. A time-interleaved analog-to-digital converter (TI-ADC) is introduced, and the TI-ADC is reconstructed and combined based on a scenario, thereby implementing flexible support for different application scenarios and reducing a chip area or costs.

With reference to the accompanying drawings, the following describes a radio frequency receiving apparatus according to an embodiment of this application. It should be understood that, a receiver in this embodiment of this application is also described in a simplified manner similar to that in FIG. 6. The simplified manner does not affect description of an innovation point of the present invention.

Figure 7:
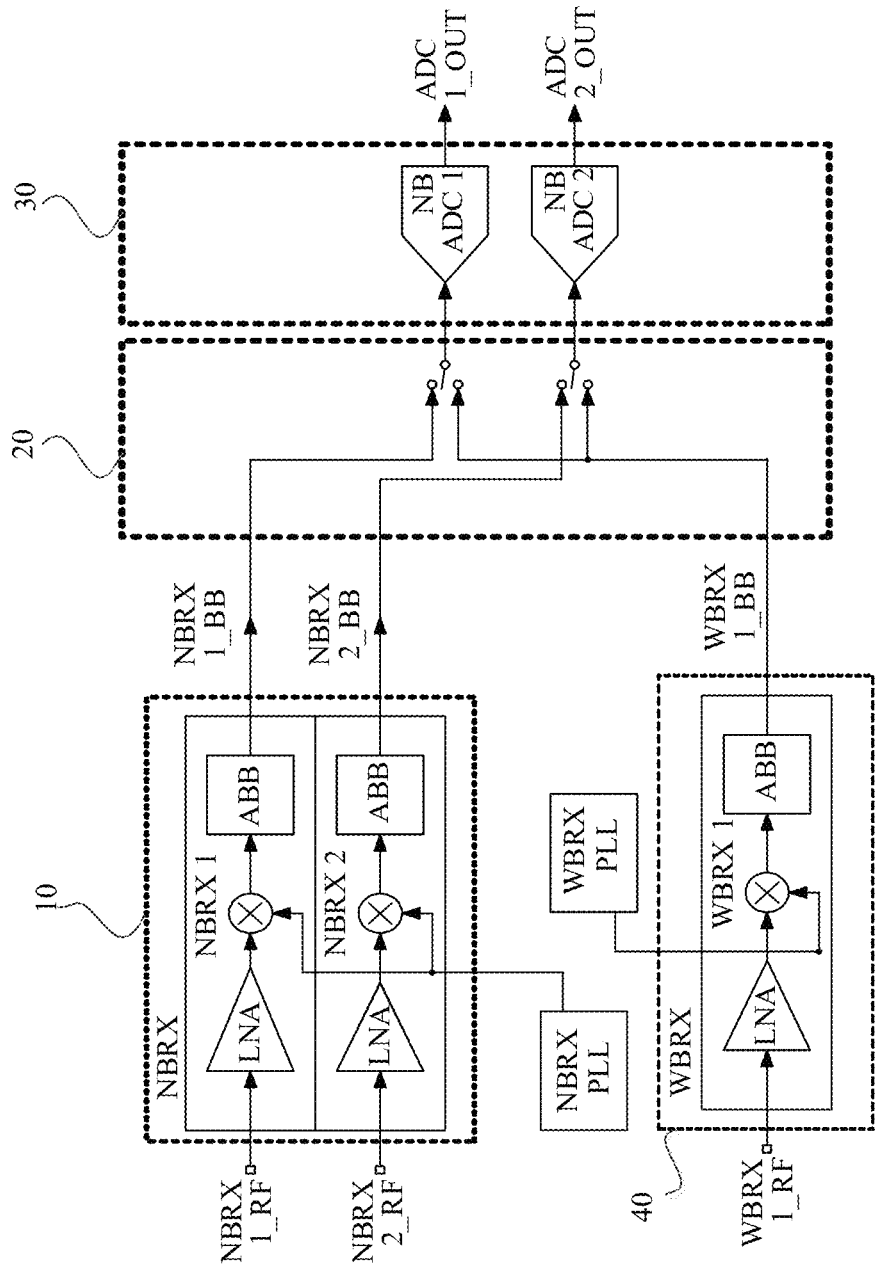
FIG. 7 is a structural block diagram of a radio frequency receiving apparatus according to an embodiment of this application.

Referring to FIG. 7, an embodiment of this application provides a radio frequency receiving apparatus. The radio frequency receiving apparatus provided in this embodiment of this application includes a first receiver 10, a second receiver 40, a channel router 20, and an analog-to-digital converter ADC group (hereinafter referred to as an ADC group) 30.

The first receiver 10 may include two receive channels. For ease of description, the two receive channels are respectively named as a first receive channel NBRX1 and a second receive channel NBRX2. The first receive channel and the second receive channel are two parallel receive channels, and a difference between the two channels is only different frequency ranges for processed signals. The first receive channel includes a first down-converter, and the second receive channel includes a second down-converter. In addition, the first receive channel and the second receive channel each further include a low noise amplifier (LNA) and an analog baseband (ABB) connected to the low noise amplifier. The analog baseband is configured to filter a signal, and may be equivalent to a filter.

The first down-converter of the first receive channel is connected to a corresponding first low noise amplifier. The first analog baseband is used as a connection end of the first receive channel, and is configured to be connected to the channel router 20. The second down-converter of the second receive channel is connected to a corresponding second low noise amplifier. The second analog baseband is used as a connection end of the second receive channel, and is configured to be connected to the channel router 20.

The second receiver 40 includes a third receive channel (WBRX1). The third receive channel includes a third down-converter. The third receive channel further includes a low noise amplifier and an analog baseband connected to the low noise amplifier. The analog baseband is configured to filter a signal, and may be equivalent to a filter. During connection, the third down-converter is connected to the low noise amplifier, and the analog baseband is used as a connection end of the receive channel, and is configured to be connected to the channel router 20.

The first receive channel, the second receive channel, and the third receive channel meet that: a maximum signal bandwidth supported by the first receive channel is less than a maximum signal bandwidth supported by the third receive channel, and a maximum signal bandwidth supported by the second receive channel is also less than a maximum signal bandwidth supported by the third receive channel. It may also be understood that a bandwidth capability of the first receive channel is less than a bandwidth capability of the third receive channel. A bandwidth capability of the second receive channel is less than a bandwidth capability of the third receive channel. A bandwidth capability refers to a maximum signal bandwidth that can be processed by a receive channel. For example, the first receiver 10 may be used as a narrow bandwidth receiver, and the second receiver 40 may be used as a wide bandwidth receiver.

The analog-to-digital converter ADC group 30 provided in this embodiment of this application is an ADC resource pool. The ADC group includes a plurality of ADCs including a first ADC (NBADC1) and a second ADC (NBADC2). For example, each ADC is a narrow bandwidth ADC. It should be understood that, when there is a plurality of ADCs, a total quantity of ADCs may be set to be less than a total quantity of receive channels. For example, when a total quantity of receive channels in the first receiver 10 and the second receiver 40 is M, and a total quantity of ADCs is N, M>N may be set. M and N are both natural numbers greater than 2. For example, when a quantity of channels (the first receive channel, the second receive channel, and the third receive channel) of the first receiver 10 and the second receivers 40 shown in FIG. 7 is three, there are two ADCs.

When the foregoing ADC group is used as the ADC resource pool, the first receiver 10 and the second receiver 40 may select, by using the channel router 20, any ADC in the ADC group for connection, to serve as a complete reception link. Selection may be specifically performed by using the channel router 20. The channel router 20 is configured to select one or more ADCs in the ADCs for the first receiver 10 and the second receiver 40 respectively. The channel router 20 may implement selection in different statuses, which are separately described in the following.

Taking the radio frequency receiving apparatus shown in FIG. 7 as an example, the channel router 20 has three statuses. The three statuses are respectively the following.

(1) In a first status, the first receive channel is coupled to a first ADC, the second receive channel is coupled to a second ADC, and the third receive channel is not coupled to any ADC. In this case, both the first receive channel and the second receive channel in the first receiver 10 are in a working status, and the third receive channel of the second receiver 40 is not in the working status. For example, when the first receive channel and the second receive channel are configured to respectively receive a first carrier and a second carrier, the channel router is configured to be in the first status. Both the first carrier and the second carrier belong to a first frequency range of a 5G communication system.

(2) In a second status, the third receive channel is coupled to both the first ADC and the second ADC simultaneously, and neither the first receive channel nor the second receive channel is coupled to any ADC. In this case, the second receiver 40 is in the working status, and the first receiver 10 is not in the working status. For example, when the third receive channel is configured to receive a third carrier, the channel router is configured to be in the second status. The third carrier belongs to a second frequency range of the 5G communication system.

(3) In a third status, the first receive channel is coupled to the second ADC, the second receive channel is coupled to the first ADC, and the third receive channel is not coupled to any ADC. In this case, both the first receive channel and the second receive channel in the first receiver 10 are in a working status, and the third receive channel of the second receiver 40 is not in the working status.

The third status is an alternative solution of the first status of the channel router 20. It can be learned from the foregoing description that, by using the channel router 20, the first receive channel and the second receive channel may be decoupled from the first ADC and the second ADC, and the first receive channel and the second receive channel may be coupled to the first ADC and the second ADC in any combination, as shown in the foregoing first status and third status.

In an optional solution, the first carrier and the second carrier are two carriers that can be used for carrier aggregation, or may be two carriers of dual connectivity (DC). Therefore, carrier aggregation can be implemented when the first ADC and the second ADC are configured for the third receive channel. For example, both the first carrier and the second carrier may belong to an LTE system or another wireless communication system. Alternatively, the first carrier belongs to a frequency range of the 5G communication system, and the second carrier belongs to a frequency range of the LTE system.

In an optional solution, the channel router 20 is a combination of a plurality of switches. For example, each ADC shown in FIG. 7 corresponds to one single-pole double-throw switch. A movable end of the single-pole double-throw switch is connected to a corresponding ADC. There are two non-movable ends. The two non-movable ends are respectively connected to the first receive channel and the third receive channel, or the two non-movable ends are respectively connected to the second receive channel and the third receive channel. When two single-pole double-throw switches are selected, the two single-pole double-throw switches may implement statuses of the channel router 20 shown in (1) and (2) or (2) and (3).

It should be understood that FIG. 7 shows only an example of a specific switch combination. However, the channel router 20 in this embodiment of this application is not limited to the switch combination shown in FIG. 7, and may further be another switch combination, for example, a multi-pole multi-throw switch. One end of the multi-pole multi-throw switch is connected to a plurality of ADCs, and the other end is connected to a plurality of ABBs, so that the first receiver 10 and the second receiver 40 may select ADCs. When the multi-pole multi-throw switch is used, the multi-pole multi-throw switch may implement the statuses of the channel router 20 shown in (1), (2), and (3). In addition to the foregoing multi-pole multi-throw switch, the channel router 20 may further be a multiplexer. The multiplexer may also implement the statuses of the channel router 20 shown in (1), (2), and (3).

It can be learned from the foregoing description that, when the radio frequency receiving apparatus provided in this embodiment of this application is disposed, all ADCs are used as a resource pool, and the channel router is configured to match corresponding ADCs for the first receiver and the second receiver to work. Therefore, a quantity of the ADCs can be reduced, an area occupied in the entire radio frequency receiving apparatus can be reduced, and application costs of the radio frequency receiving apparatus can also be reduced.

Figure 8:
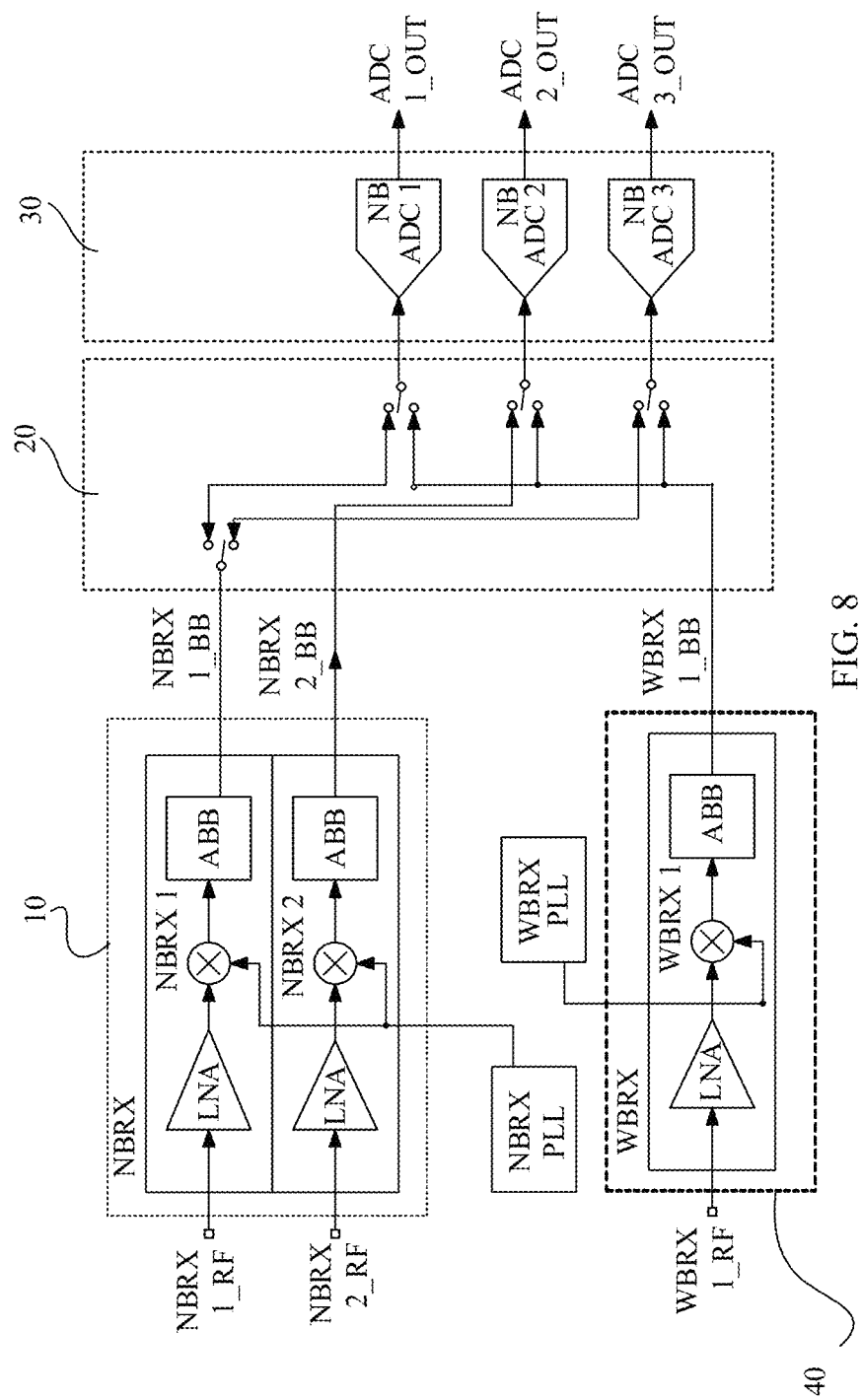
FIG. 8 is another structural block diagram of a radio frequency receiving apparatus according to an embodiment of this application.

FIG. 8 is another structural block diagram of a radio frequency receiving apparatus according to an embodiment of this application. In the radio frequency receiving apparatus shown in FIG. 7, a quantity of ADCs are increased.

The ADC group 30 further includes a third ADC, that is, the ADC group 30 includes the first ADC, the second ADC, and the third ADC. The channel router 20 further has a third working status. When the channel router 20 is in the third status, a first receive channel is coupled to the third ADC, and a third receive channel is coupled to the first ADC and the second ADC. In this case, the channel router 20 has the following working statuses:

(1) The first receive channel is coupled to the first ADC, a second receive channel is coupled to the second ADC, and the third receive channel is not coupled to any ADC. In this case, both the first receive channel and the second receive channel in the first receiver 10 are in a working status, and the third receive channel of the second receiver 40 is not in the working status.

(2) The third receive channel is coupled to both the first ADC and the second ADC simultaneously, and neither the first receive channel nor the second receive channel is coupled to any ADC. In this case, the second receiver 40 is in the working status, and the first receiver 10 is not in the working status.

(3) The first receive channel is coupled to the second ADC, the second receive channel is coupled to the first ADC, and the third receive channel is not coupled to any ADC. In this case, both the first receive channel and the second receive channel in the first receiver 10 are in a working status, and the third receive channel of the second receiver 40 is not in the working status. When the first receive channel and the second receive channel are configured to respectively receive a first carrier and a second carrier, and the third receive channel is configured to receive a third carrier, the channel router is configured to be in the third status. Both the first carrier and the second carrier belong to a first frequency range of a 5G communication system, and the third carrier belong to a second frequency range of the 5G communication system.

(4) The first receive channel is coupled to the third ADC, and the third receive channel is coupled to the first ADC and the second ADC. In this case, the first receive channel of the first receiver 10 is in the working status, the second receive channel is not in the working status, and the second receiver 40 is in the working status.

(5) The first receive channel is coupled to the first ADC, and the third receive channel is coupled to the second receive channel and the third receive channel. In this case, the first receive channel of the first receiver 10 is in the working status, the second receive channel is not in the working status, and the second receiver 40 is in the working status.

It can be seen from the foregoing description that, as a multiplexed ADC, the third ADC may be used by the first receiver 10 and may also be used by the second receiver 40. When the radio frequency receiving apparatus is used, the radio frequency receiving apparatus can support at least one channel of narrow bandwidth receiving and at least one channel of wide bandwidth receiving simultaneously. For example, narrow bandwidth reception (by the third ADC) and wide bandwidth reception (by the first ADC and second ADC) in status (4) or narrow bandwidth reception (by the first ADC) and wide bandwidth reception (by the second ADC and third ADC) in status (5).

When the foregoing statuses are implemented, the channel router 20 is a combination of a plurality of switches. For example, each ADC shown in FIG. 7 corresponds to one single-pole double-throw switch, and single-pole double-throw switches corresponding to the first ADC, the second ADC, and the third ADC are respectively named as a first single-pole double-throw switch, a second single-pole double-throw switch, and a third single-pole double-throw switch. In addition, the first connection channel is connected to a fourth single-pole double-throw switch. A movable end of the fourth single-pole double-throw switch is connected to a first ABB of the first receive channel. A non-movable end of the fourth single-pole double-throw switch is separately connected to one non-movable end of the first single-pole double-throw switch and one non-movable end of the third single-pole double-throw switch. When the fourth single-pole double-throw switch and the first single-pole double-throw switch are turned on, the first receive channel may be coupled to the first ADC. When the fourth single-pole double-throw switch and the third single-pole double-throw switch are turned on, the first receive channel may be coupled to the third ADC. The first single-pole double-throw switch, the second single-pole double-throw switch, the third single-pole double-throw switch, and the fourth single-pole double-throw may implement the statuses shown in (1), (2), (4), and (5).

It should be understood that FIG. 8 shows only an example of a specific switch combination. However, the channel router 20 in this embodiment of this application is not limited to the switch combination shown in FIG. 8, and may further be another switch combination, for example, a multi-pole multi-throw switch. One end of the multi-pole multi-throw switch is connected to a plurality of ADCs, and the other end is connected to a plurality of ABBs, so that the first receiver 10 and the second receiver 40 may select ADCs. When the multi-pole multi-throw switch is used, the multi-pole multi-throw switch may implement the statuses of the channel router 20 shown in (1), (2), and (3). In addition to the foregoing multi-pole multi-throw switch, the channel router 20 may further be a multiplexer. The multiplexer may also implement the statuses of the channel router 20 shown in (1), (2), (3), (4), and (5).

In an extended solution, the ADC group further includes a fourth ADC. When the channel router is in a fourth status, the first receive channel is coupled to the first ADC, and the third receive channel is coupled to the second ADC and the fourth ADC. In addition, a situation of the fourth status is similar to that of the third status. For details, please refer to the foregoing status (3).

Structures of the first receiver 10 and the second receiver 40 provided in this embodiment of this application are not limited to structures shown in FIG. 7 and FIG. 8. The first receiver 10 and the second receiver 40 may further be provided with different quantities of receive channels. For example, the first receiver 10 includes N1 receive channels, and the N1 receive channels are respectively the first receive channel, the second receive channel, the third receive channel, ..., and an $N^{th}$ receive channel. The second receiver 40 includes N2 receive channels, which are respectively an $(N1+1)^{th}$ receive channel, an $(N1+2)^{th}$ receive channel, ..., and an $(N1+N2)^{th}$ receive channel. Both N1 and N2 are natural numbers, and N1>2. For ease of example, the following uses N1=8 and N2=2 as an example for description.

Figure 9:
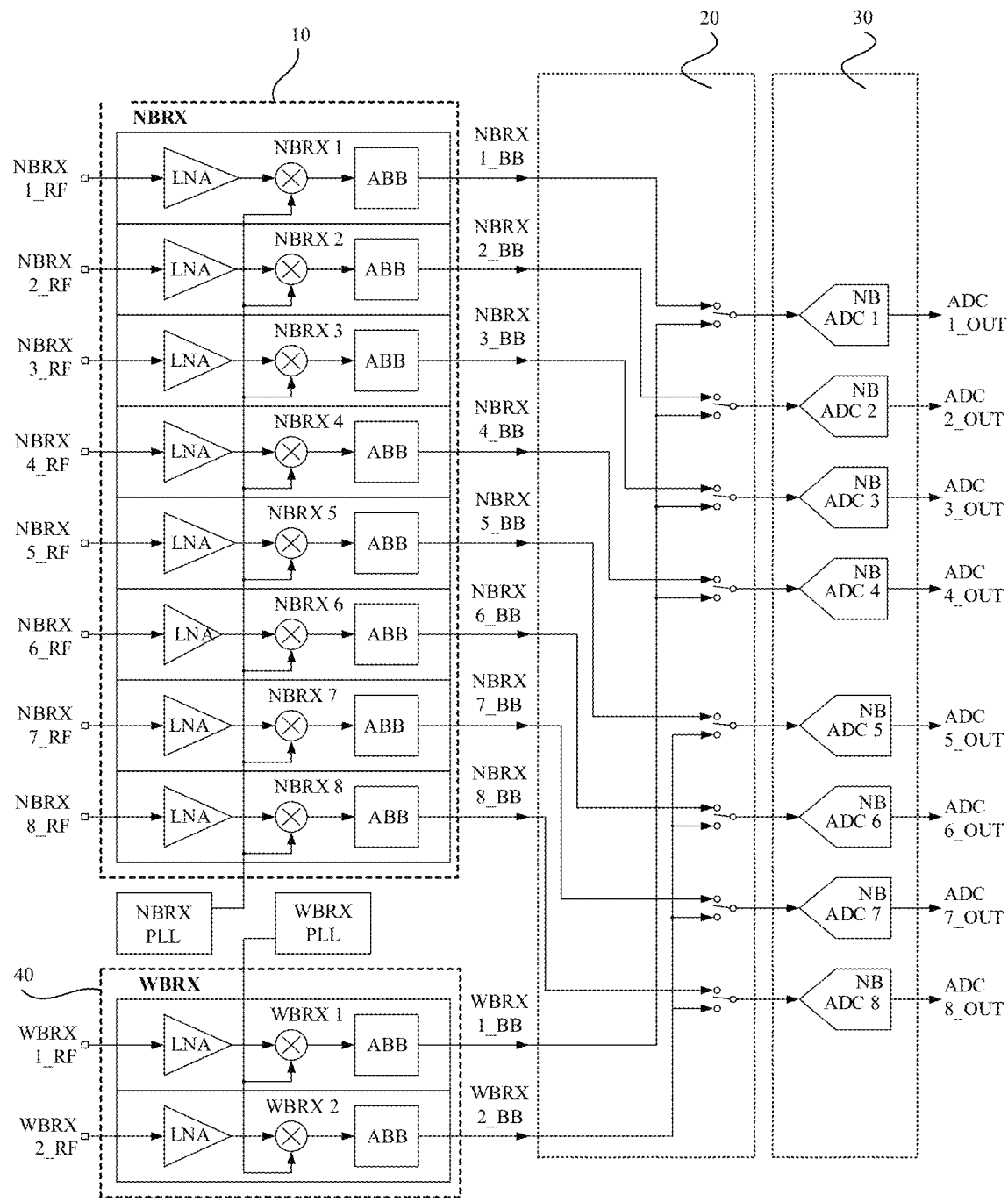
FIG. 9 is still another structural block diagram of a radio frequency receiving apparatus according to an embodiment of this application.

Referring to FIG. 9, an ADC resource pool (ADC Bank) and a channel router 20 are introduced into a radio frequency receiving apparatus provided in an embodiment of this application.

The ADC resource pool provides ADC resources required in two different application scenarios: an NR FR1 and an NR FR2. A first receiver 10 corresponds to the NR FR1, and a second receiver 40 corresponds to the NR FR2.

A size of an ADC resource is measured by using a bandwidth capability of an ADC for processing a signal. The radio frequency receiving apparatus shown in FIG. 9 is used as an example. In this example, eight narrow bandwidth (NB) ADCs are designed in the ADC resource pool, and the eight narrow bandwidth ADCs are an NB ADC1 to an NB ADC8 respectively. Assuming that a bandwidth capability of each NB ADC for processing a signal is 200 MHz, a total processing capability of the ADC resource pool is 1,600 MHz (8×200 MHz). According to the radio frequency receiving apparatus provided in this embodiment of this application, as long as a total signal bandwidth capability does not exceed the size of an ADC resource pool, different scenarios may be supported by using a combination relationship of ADCs.

When the NB ADC supports the second receiver 40, a TI-ADC technology is introduced, and different application scenarios are combined for different application scenarios, so as to support different application scenarios. For example, an NB ADC1 to an NB ADC4 are combined into one wide bandwidth (WB) ADC, that is, a WB ADC1. The WB ADC1 is provided for a WB RX1 to convert a large-bandwidth radio frequency signal received by the WB RX1 into a digital signal. An NB ADC5 to an NB ADC8 in the ADC resource pool are combined into another wide bandwidth ADC, that is, a WB ADC2. The WB ADC2 is configured to convert a wide bandwidth signal received by a WB RX2 into a digital signal.

The first receiver 10 is configured to support an application in an NR FR1. The first receiver 10 has eight receive channels: a first receive channel to an eighth receive channel. The first receive channel to the eighth receive channel all receive signals in an NR FR1 by using NBRX channels, that is, eight NBRX channels (NBRX1, NBRX2, ..., NBRX8).

The second receiver 40 is configured to support an NR FR2. The second receiver 40 has two receive channels: a ninth receive channel and a tenth receive channel. The ninth receive channel and the tenth receive channel are WBRX channels respectively.

The channel router 20 is located between an analog baseband output and the ADC resource pool. Each ADC in the ADC resource pool may be configured by configuring the channel router 20, thereby supporting different application scenarios.

For ease of understanding a usage manner for the radio frequency receiving apparatus provided in this embodiment of this application, the following uses the radio frequency receiving apparatus shown in FIG. 9 as an example to describe in detail the radio frequency receiving apparatus provided in an embodiment of this application.

Figure 10:
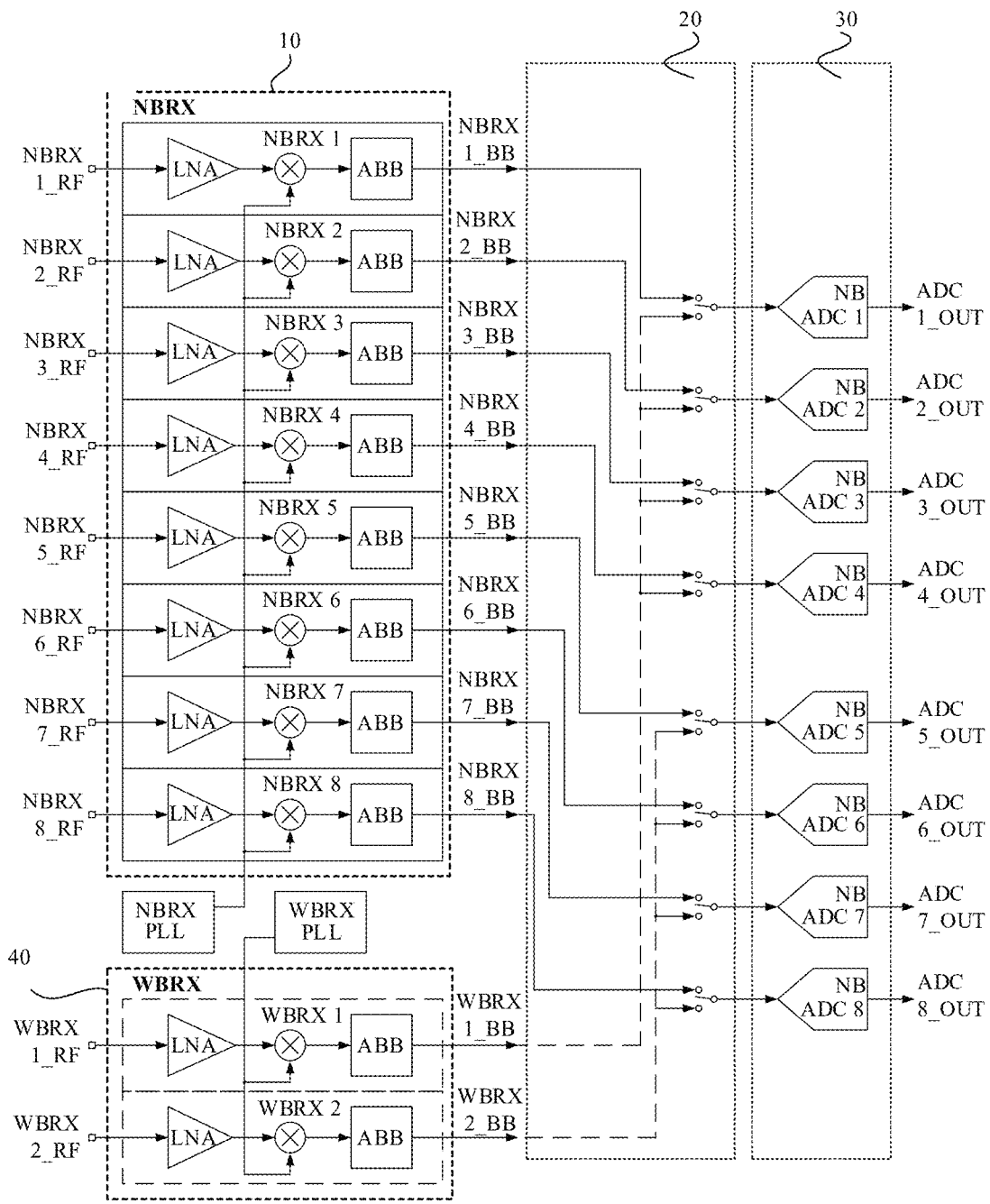
FIG. 10 is a structural block diagram in which a radio frequency receiving apparatus supports an application in an NR FR1, according to an embodiment of this application.

FIG. 10 shows that a radio frequency receiving apparatus according to an embodiment of this application supports an application in an NR FR1. In the application in the NR FR1, a receiver allocates limited spectrum resources to a single user. However, due to a characteristic of an NR FR1 radio channel, a data throughput of a single terminal user may be increased by using spatial multiplexing and through a multiple-antenna technology such as MIMO. Therefore, in an NR FR1 scenario, a first receiver 10 is characterized by a large quantity of channels but a narrow signal bandwidth of each receive channel.

The radio frequency receiving apparatus according to this embodiment of this application shown in FIG. 10 is used as an example. FIG. 10 shows an application of wireless communication by the radio frequency receiving apparatus in an NR FR1 in this application. The channel router 20 respectively configures eight ADCs for eight NBRX channels. In FIG. 10, a meaning that a WBRX1 and a WBRX2 are marked by using dashed lines means that the WBRX1 and the WBRX2 are not in a working status.

During use, the eight NBRX channels (NBRX1, NBRX2, ..., NBRX8) receive signals in an NR FR1. ADC resources (eight NB ADCs) in the radio frequency receiving apparatus in this application are respectively allocated to the eight NBRX channels through the channel router 20. An output (ADC1_OUT, ADC2_OUT, ..., or ADC8_OUT) of each NB ADC is an output of each receive channel. Assuming that a bandwidth for processing a signal by each NB ADC is 200 MHz, the radio frequency receiving apparatus according to this embodiment of this application shown in FIG. 10 may support an 8×8 MIMO application of a 200 MHz signal bandwidth in the NR FR1.

Figure 11:
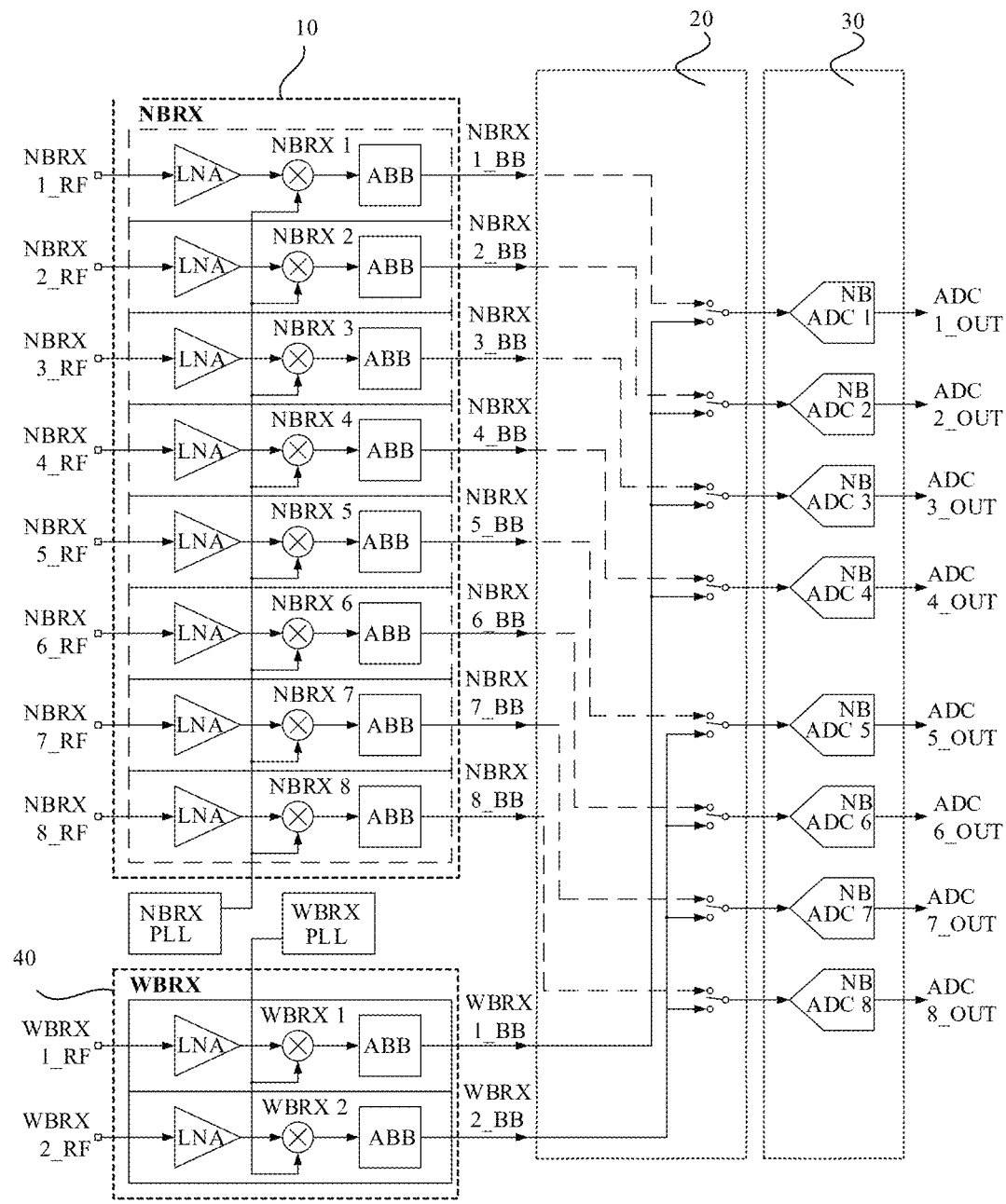
FIG. 11 is a structural block diagram in which a radio frequency receiving apparatus supports an application in an NR FR2, according to an embodiment of this application.

FIG. 11 shows that a radio frequency receiving apparatus supports an application in an NR FR2 according to an embodiment of this application. In an NR FR2, a radio frequency system works in a millimeter-wave frequency range. The millimeter-wave frequency range has abundant spectrum resources. Therefore, a larger bandwidth may be allocated to a single user. In addition, due to factors such as a channel condition of the millimeter-wave frequency range, a large quantity of receive channels are usually not used in the application in the NR FR2. For a common application in the NR FR2, two WBRX channels are used to respectively receive data streams in a vertical polarization direction and a horizontal polarization direction of a millimeter-wave antenna array. Therefore, the radio frequency receiving apparatus for the application in the NR FR2 is characterized by a large signal bandwidth of a single receive channel but a small quantity of applied receive channels.

The radio frequency receiving apparatus provided in this embodiment of this application shown in FIG. 11 is used as an example to provide an application of the radio frequency receiving apparatus to NR FR2 wireless communication in this application. As shown in FIG. 11, in the application in the NR FR2, two WBRX channels are enabled to receive two radio frequency signals. In FIG. 11, a meaning indicated by dashed lines in an NBRX1 to an NBRX8 is that the NBRX1 to NBRX8 are not in a working status. NB ADCs in an ADC resource pool of the radio frequency receiving apparatus provided in this embodiment of this application are combined based on an application requirement of the NR FR2. An NB ADC1 to an NB ADC4 are combined into one wide bandwidth (WB) ADC, that is, a WB ADC1. The WB ADC1 is provided for a WB RX1 to convert a large-bandwidth radio frequency signal received by the WB RX1 into a digital signal. An NB ADC5 to an NB ADC8 in the ADC resource pool are combined into another wide bandwidth ADC, that is, a WB ADC2. The WB ADC2 is configured to convert a wide bandwidth signal received by a WB RX2 into a digital signal.

In specific implementation, a plurality of parallel digital signals (an ADC_OUT1 to an ADC_OUT4 and an ADC_OUT5 to an ADC_OUT8) output by two WB ADCs is further processed, and are combined into one digital signal that can represent a signal received by a wide bandwidth receiver.

A method for combining a plurality of narrow bandwidth (NB) ADCs into one wide bandwidth (WB) ADC is based on a time-interleaved ADC (TI-ADC) technology. The radio frequency receiving apparatus provided in this embodiment of this application further includes an ADC controller coupled to an ADC group. The ADC controller is configured to equate at least two ADCs in the ADC group as a combined ADC. A maximum signal bandwidth supported by the combined ADC is greater than a maximum signal bandwidth supported by any one of the at least two ADCs. That is, at least two narrow bandwidth ADCs in the ADC group are equivalently combined into one wide bandwidth ADC by using the ADC controller. In specific combination, the ADC controller is configured to provide a clock signal for each of the at least two ADCs. Frequencies of clock signals corresponding to different ADCs of the at least two ADCs are the same. Phases of the clock signals corresponding to different ADCs of the at least two ADCs are interleaved.

Figure 12:
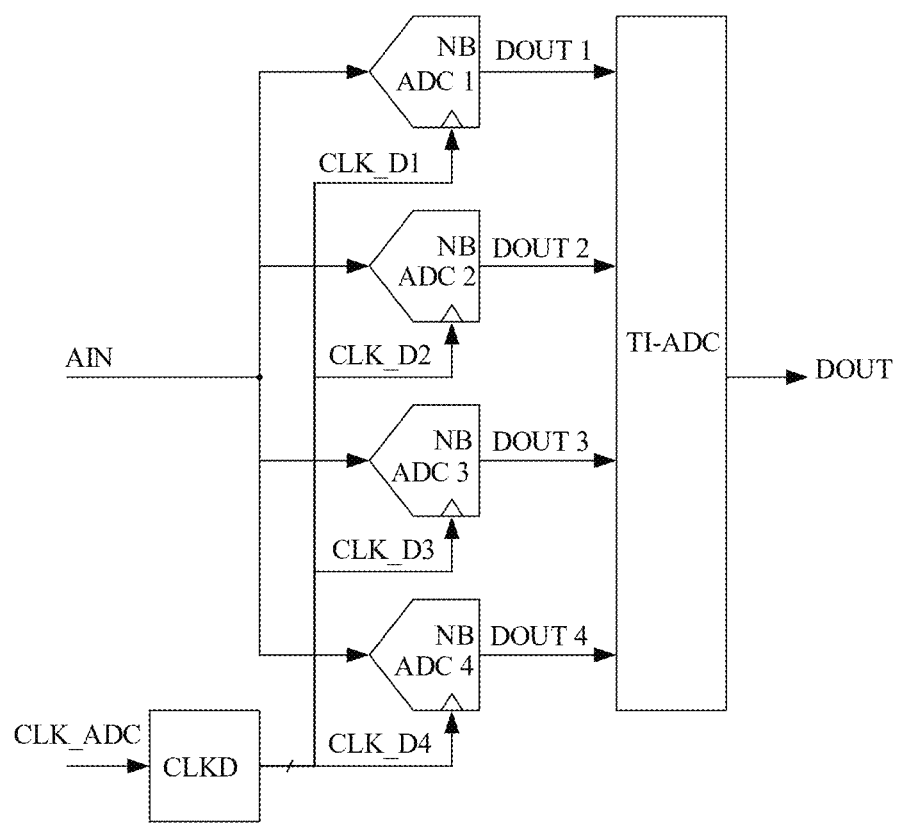
FIG. 12 is a structural block diagram of a TI-ADC.

FIG. 12 shows a basic principle of a TI-ADC. A plurality of narrow bandwidth ADCs works in parallel, and clocks used by the narrow bandwidth ADCs are interleaved in phases. In this method, each narrow bandwidth ADC still works at a low clock frequency. However, if a plurality of ADCs works in parallel, and a clock signal with phases interleaved is used, the plurality of ADCs may be equivalent to a wide bandwidth ADC component as a whole.

The TI-ADC formed by four NB ADCs shown in FIG. 12 is used as an example. FIG. 12 further describes a working principle of the TI-ADC. A working clock of the TI-ADC is a CLK_ADC. A clock frequency of the working clock is $f_{CLK\_ADC}$. The clock may obtain clock signals whose frequency is $f_{CLK\_ADC}/4$ and phase difference is $$\frac{2\pi}{4}$$

of four narrow bandwidth ADCs, by using a plurality of clock dividers (CLKD). The clock signals are CLK_D1 to CLK_DIV4 respectively. The four clock signals are sent to four NB ADCs as sampling clocks of NB ADCs respectively, to sample a same analog input signal AIN. As shown in FIG. 12, although the frequency of the CLK_ADC is high, a frequency of a sampling clock that is actually sent to each NB ADC is greatly reduced. That is, each NB ADC only needs to work at a low clock frequency.

Figure 13A:
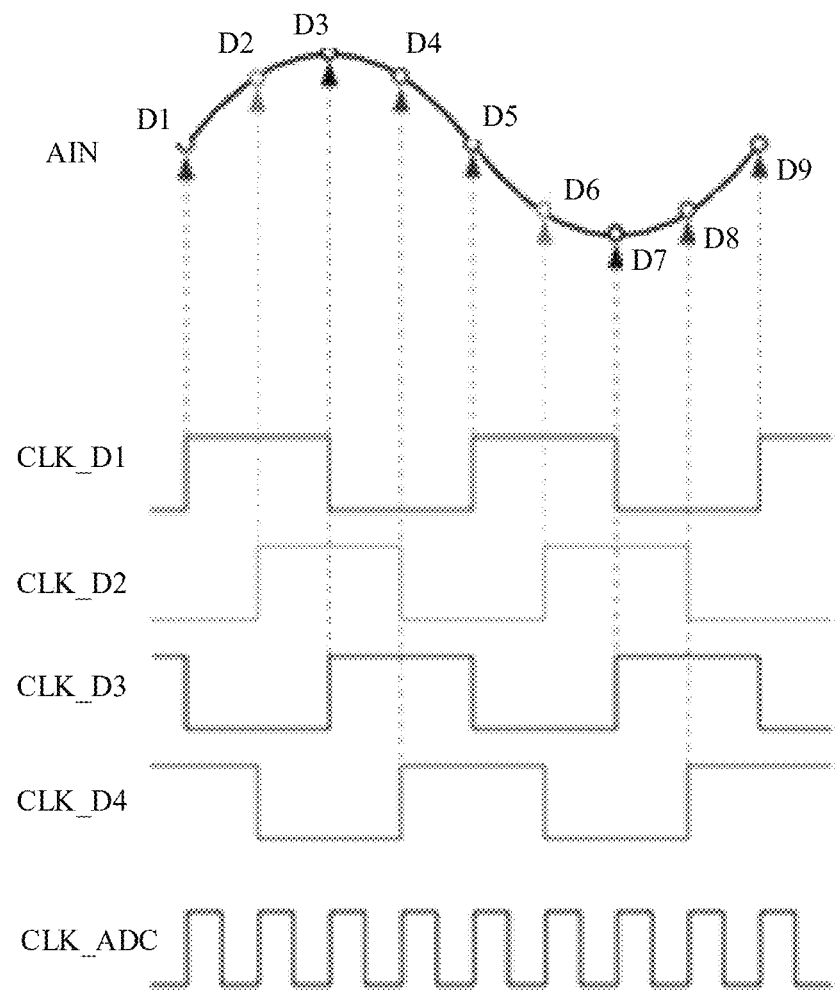
FIG. 13a and FIG. 13b are schematic diagrams of outputs corresponding to samples of a TI-ADC.
Figure 13B:
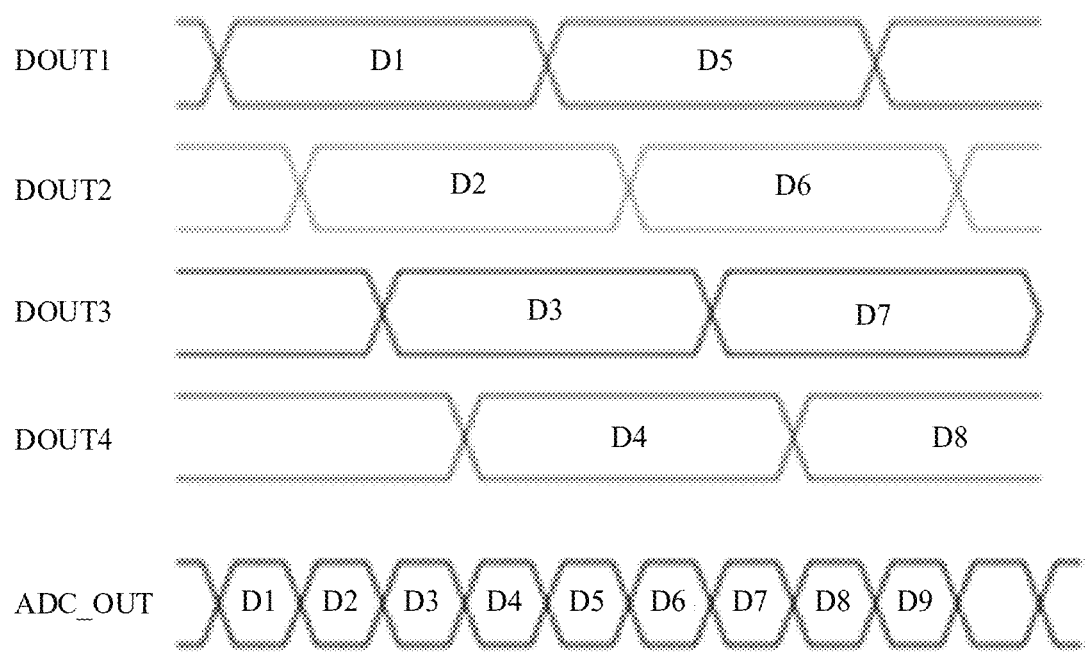

As shown in FIG. 13*a* and FIG. 13*b*, in four NB ADCs, sampling clocks of the ADCs respectively perform sampling on a same analog input signal AIN. Because a phase difference between the sampling clocks is $$\frac{2\pi}{4},$$

on the whole, although a frequency $f_{CLK\_ADC}/4$ of a sampling clock of each ADC is low, a TI-ADC formed by four NB ADCs may still be equivalent to a wide bandwidth ADC of a sampling clock whose frequency is $f_{CLK\_ADC}$.

With reference to FIG. 12, FIG. 13a, and FIG. 13b, it can be learned that in a receiver provided in this embodiment of this application, a plurality of narrow bandwidth ADCs may be equivalent to one wide bandwidth ADC. Therefore, ADCs of a first receiver and a second receiver may be integrated to be included in one ADC resource pool.

In conclusion, in the application in the NR FR2, the radio frequency receiving apparatus provided in this embodiment of this application combines NB ADCs in the ADC resource pool, to form a WB ADC that can support a larger bandwidth signal, so that a large bandwidth receiver required in the NR FR2 can work. Similar to the foregoing Embodiment, assuming that a signal bandwidth processing capability of a single NB ADC is 200 MHz, a WB ADC included by combining four NB ADCs has a signal bandwidth processing capability of 800 MHz. As shown in FIG. 11, the radio frequency receiving apparatus according to the present invention may support, by configuring an ADC resource pool, a two-data-stream receiving operation of an NR FR2 800 MHz signal bandwidth may be supported.

In addition to the application scenario of the NR FR1 in FIG. 10 and the application scenario of the NR FR2 described in FIG. 11, the receiver provided in this embodiment of this application may be further applied to a scenario in which the NR FR1 and the NR FR2 coexist in an NR communication system. The NR FR1 is a low working frequency range, and attenuation of a radio signal is weak. Therefore, a long transmission distance and a stable wireless connection can be implemented. In the NR FR2, spectrum resources are more abundant, and a radio signal with a larger bandwidth can be transmitted to obtain a higher data throughput. Therefore, in the NR communication system, advantages of two frequency ranges, the NR FR1 and NR FR2, are combined to construct a communication system with better performance and more stable connections.

Figure 14:
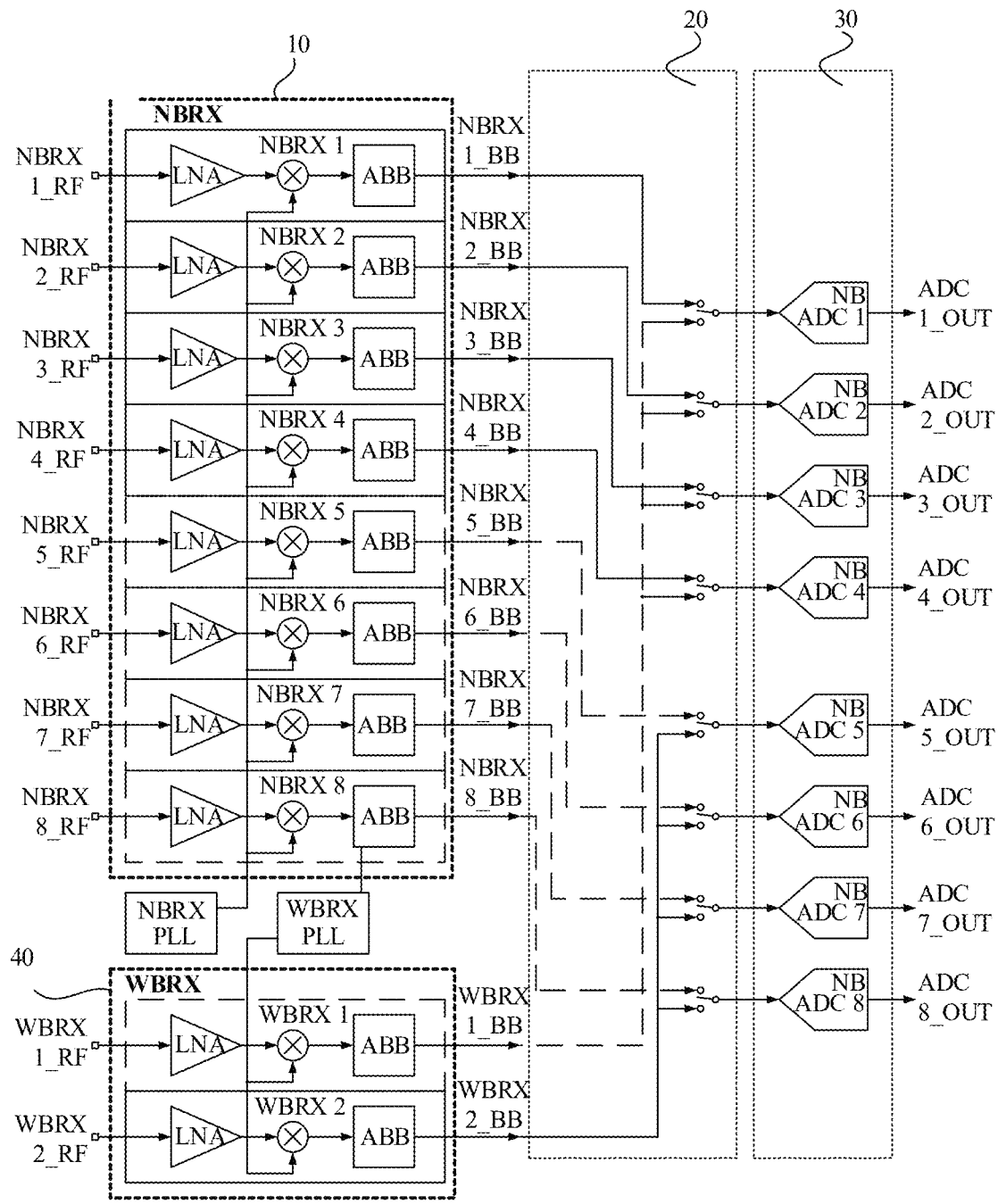
FIG. 14 is a radio frequency receiving apparatus applied to a communication scenario in which an NR FR1 and an NR FR2 coexist.

FIG. 14 provides a radio frequency receiving apparatus applied to a communication scenario in which an NR FR1 and an NR FR2 coexist. In this application scenario, four NBRX channels, an NBRX1 to an NBRX4, are enabled to receive radio frequency signals of the NR FR1, and four NBRX channels, an NBRX5 to an NBRX8, are disabled (marked by dashed lines). In an ADC resource pool, an NB ADC1 to an NB ADC4 are respectively connected to the NBRX1 to the NBRX4, to convert the receiver signals of the NBRX1 to the NBRX4 into digital signals, and output the digital signals to a following processor. Assuming that each NB ADC has a signal bandwidth processing capability of 200 MHz, in this application scenario, four NBRX channels can support a communication application of 4×4 MIMO with a 200 MHz signal bandwidth in the NR FR1.

In addition, in this application scenario, a WBRX2 is enabled to receive a radio frequency signal in the NR FR2, and a WBRX1 is disabled (marked by a dashed line). In the ADC resource pool, four NB ADCs, an NB ADC5 to an NB ADC8, are combined into one wide bandwidth ADC, that is, a WB ADC2. The WB ADC2 is connected to a WBRX2 channel, to convert a signal in the NR FR2 received by the WBRX2 into a digital signal. As described above, assuming that a signal bandwidth capability of one NB ADC is 200 MHz, one WB ADC including four NB ADCs may support a signal bandwidth of 800 MHz. That is, in this application, one 800 MHz signal in the NR FR2 may be received.

It can be learned from the foregoing description that the radio frequency receiving apparatus provided in this embodiment of this application may be used in an application scenario in which the NR FR1 and the NR FR2 coexist. A total communication capability supports 4×4 MIMO communication in the 200 MHz signal bandwidth in the NR FR1 and the 800 MHz signal bandwidth in the NR FR2.

Because a total bandwidth processing capability of the ADC resource pool is limited, a total signal bandwidth capability that can be processed by the receiver in the present invention is determined. The radio frequency receiving apparatus in the present invention may support an application scenario in which both the NR FR1 and the NR FR2 coexist. A communication capability may be allocated between the NR FR1 and the NR FR2, but a total communication bandwidth is determined.

An embodiment of this application further provides a millimeter-wave antenna module. The millimeter-wave antenna module includes the radio frequency receiving apparatus according to any one of the foregoing and an antenna. Each receive channel of the first receiver and the second receiver is correspondingly connected to one antenna.

An embodiment of this application further provides a chip module. The chip module includes the radio frequency receiving apparatus according to any one of the foregoing and a baseband processing apparatus. Each receive channel of the first receiver and the second receiver is connected to the baseband processing apparatus.

An embodiment of this application further provides a wireless communication apparatus. The wireless communication apparatus includes a housing, and the radio frequency receiving apparatus, according to any one of the foregoing, disposed in the housing. The wireless communication apparatus may be a structure shown in FIG. 2. The wireless communication apparatus includes the foregoing radio frequency receiving apparatus and an antenna connected to the radio frequency receiving apparatus. ADC resources of the first receiver and the second receiver are multiplexed, and different ADCs are selected, by using the channel router, to be matched to the first receiver and the second receiver. Therefore, a quantity of ADCs are reduced, and a volume of the radio frequency receiving apparatus, a layout area, and costs are further reduced.

In the embodiments of this application and the accompanying drawings, the terms "first", "second", "third", and the like are intended to distinguish between similar objects but do not necessarily indicate a specific order or sequence. In addition, the terms "include", "have", and any other variants thereof are intended to indicate non-exclusive inclusions, for example, including a series of steps or units. The method, system, product, or device is not limited to the steps or units that are literally listed, but may include other steps or units that are not literally listed or that are inherent to these processes, methods, products, or devices.

It should be understood that in this application, "at least one" refers to one or more, and "a plurality of" refers to two or more. The term "and/or" is used for describing an association relationship between associated objects, and represents that three relationships may exist. For example, "A and/or B" may represent the following three cases: only A exists, only B exists, and both A and B exist, where A and B may be singular or plural. The character "/" generally indicates an "or" relationship between the associated objects. "At least item (piece) of the following" or a similar expression thereof means any combination of these items, including a single item (piece) or any combination of plural items (pieces). For example, at least one of a, b, or c may indicate a, b, c, a and b, a and c, b and c, or a, b, and c, where a, b, and c may be singular or plural.

It should be understood that sequence numbers of the foregoing processes do not mean execution sequences in this application. The execution sequences of the processes should be determined according to functions and internal logic of the processes, and should not be construed as any limitation on the implementation processes of embodiments of this application. The term "coupling" mentioned in this application is used for indicating interworking or interaction between different components, and may include a direct connection or an indirect connection performed by using another component.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, comprising:
a first receiver, comprising a first receive channel and a second receive channel, wherein the first receive channel comprises a first down-converter, and the second receive channel comprises a second down-converter;
a second receiver, comprising a third receive channel, wherein the third receive channel comprises a third down-converter, a first maximum signal bandwidth supported by the first receive channel is less than a third maximum signal bandwidth supported by the third receive channel, and a second maximum signal bandwidth supported by the second receive channel is less than the third maximum signal bandwidth supported by the third receive channel;
an analog-to-digital converter (ADC) group, comprising a plurality of ADCs, wherein the plurality of ADCs comprises a first ADC and a second ADC; and
a channel router, configured to:
separately select one or more ADCs in the ADC group for the first receiver and the second receiver, wherein when the channel router is in a first status, the first receive channel is coupled to the first ADC, the second receive channel is coupled to the second ADC, and when the channel router is in a second status, the third receive channel is coupled to the first ADC and the second ADC.

2. The apparatus according to claim 1,
wherein the ADC group further comprises a third ADC, and when the channel router is in a third status, the first receive channel is coupled to the third ADC, and the third receive channel is coupled to the first ADC and the second ADC.

3. The apparatus according to claim 2,
wherein the ADC group further comprises a fourth ADC, and when the channel router is in a fourth status, the first receive channel is coupled to the first ADC, and the third receive channel is coupled to the second ADC and the fourth ADC.

4. The apparatus according to claim 3,
wherein, when the first receive channel and the second receive channel are configured to respectively receive a first carrier and a second carrier, and the third receive channel is configured to receive a third carrier, the channel router is configured to be in the third status or the fourth status, wherein the first carrier and the second carrier belong to a first frequency range of a 5G communication system, and the third carrier belongs to a second frequency range of the 5G communication system.

5. The apparatus according to claim 1, further comprising:
an ADC controller coupled to the ADC group, wherein the ADC controller is configured to:
equate at least two ADCs in the ADC group as a combined ADC, and a combined maximum signal bandwidth supported by the combined ADC is greater than a maximum signal bandwidth supported by any ADC of the at least two ADCs.

6. The apparatus according to claim 5,
wherein the ADC controller is configured to:
provide a clock signal for each of the at least two ADCs, wherein frequencies of clock signals corresponding to different ADCs of the at least two ADCs are the same, and phases of the clock signals corresponding to different ADCs of the at least two ADCs are interleaved.

7. The apparatus according to claim 1,
wherein the channel router is a combination of a plurality of switches.

8. The apparatus according to claim 7,
wherein the channel router is a multiplexer.

9. The apparatus according to claim 1, wherein any ADC in the ADC group is a narrow bandwidth ADC.

10. The apparatus according to claim 1,
wherein, when the first receive channel and the second receive channel are configured to respectively receive a first carrier and a second carrier, the channel router is configured to be in the first status, wherein a first frequency of the first carrier and a second frequency of the second carrier belong to a first frequency range of a 5G communication system, or
wherein, when the third receive channel is configured to receive a third carrier, the channel router is configured to be in the second status, wherein a third frequency of the third carrier belongs to a second frequency range of the 5G communication system.

11. A millimeter-wave antenna, comprising:
a radio frequency receiving apparatus and an antenna, wherein the radio frequency receiving apparatus comprises:
a first receiver, comprising a first receive channel and a second receive channel, wherein the first receive channel comprises a first down-converter, and the second receive channel comprises a second down-converter;
a second receiver, comprising a third receive channel, wherein the third receive channel comprises a third down-converter, a first maximum signal bandwidth supported by the first receive channel is less than a third maximum signal bandwidth supported by the third receive channel, and a second maximum signal bandwidth supported by the second receive channel is also less than the third maximum signal bandwidth supported by the third receive channel;
an analog-to-digital converter (ADC) group, comprising a plurality of ADCs, wherein the plurality of ADCs comprises a first ADC and a second ADC; and
a channel router, configured to:
separately select one or more ADCs in the ADC group for the first receiver and the second receiver, wherein when the channel router is in a first status, the first receive channel is coupled to the first ADC, the second receive channel is coupled to the second ADC, and when the channel router is in a second status, the third receive channel is coupled to the first ADC and the second ADC, wherein each receive channel of the first receiver and the second receiver is correspondingly connected to the antenna.

12. The millimeter-wave antenna according to claim 11, wherein the ADC group further comprises a third ADC, and when the channel router is in a third status, the first receive channel is coupled to the third ADC, and the third receive channel is coupled to the first ADC and the second ADC.

13. The millimeter-wave antenna according to claim 12, wherein the ADC group further comprises a fourth ADC, and when the channel router is in a fourth status, the first receive channel is coupled to the first ADC, and the third receive channel is coupled to the second ADC and the fourth ADC.

14. The millimeter-wave antenna according to claim 11, further comprising:
an ADC controller coupled to the ADC group, wherein the ADC controller is configured to:
equate at least two ADCs in the ADC group as a combined ADC, and a combined maximum signal bandwidth supported by the combined ADC is greater than a maximum signal bandwidth supported by any ADC of the at least two ADCs.

15. The millimeter-wave antenna according to claim 14, wherein the ADC controller is configured to:
provide a clock signal for each of the at least two ADCs, wherein frequencies of clock signals corresponding to different ADCs of the at least two ADCs are the same, and phases of the clock signals corresponding to different ADCs of the at least two ADCs are interleaved.

16. The millimeter-wave antenna according to claim 11, wherein the channel router is a combination of a plurality of switches.

17. The millimeter-wave antenna according to claim 16, wherein the channel router is a multiplexer.

18. The millimeter-wave antenna according to claim 17, wherein any ADC in the ADC group is a narrow bandwidth ADC.

19. The millimeter-wave antenna according to claim 11, wherein, when the first receive channel and the second receive channel are configured to respectively receive a first carrier and a second carrier, the channel router is configured to be in the first status, wherein a first frequency of the first carrier and a second frequency of the second carrier belong to a first frequency range of a 5G communication system, or wherein, when the third receive channel is configured to receive a third carrier, the channel router is configured to be in the second status, wherein a third frequency of the third carrier belongs to a second frequency range of the 5G communication system.

20. A chip, comprising:
a radio frequency receiving apparatus and a baseband processing apparatus, wherein the radio frequency receiving apparatus comprises:
a first receiver, comprising a first receive channel and a second receive channel, wherein the first receive channel comprises a first down-converter, and the second receive channel comprises a second down-converter;
a second receiver, comprising a third receive channel, wherein the third receive channel comprises a third down-converter, a first maximum signal bandwidth supported by the first receive channel is less than a third maximum signal bandwidth supported by the third receive channel, and a second maximum signal bandwidth supported by the second receive channel is also less than the third maximum signal bandwidth supported by the third receive channel;
an analog-to-digital converter (ADC) group, comprising a plurality of ADCs, wherein the plurality of ADCs comprises a first ADC and a second ADC; and
a channel router, configured to:
separately select one or more ADCs in the ADC group for the first receiver and the second receiver, wherein when the channel router is in a first status, the first receive channel is coupled to the first ADC, the second receive channel is coupled to the second ADC, and when the channel router is in a second status, the third receive channel is coupled to the first ADC and the second ADC, wherein each receive channel of the first receiver and the second receiver is connected to the baseband processing apparatus.

* * * * *